(12) United States Patent
Hara

(10) Patent No.: US 8,289,581 B2
(45) Date of Patent: Oct. 16, 2012

(54) IMAGE PROCESSING APPARATUS, TRANSFER JOB MANAGING METHOD, PROGRAM FOR IMPLEMENTING THE METHOD, AND STORAGE MEDIUM STORING THE PROGRAM

(75) Inventor: Kenji Hara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1418 days.

(21) Appl. No.: 11/318,321

(22) Filed: Dec. 23, 2005

(65) Prior Publication Data
US 2006/0139699 A1  Jun. 29, 2006

(30) Foreign Application Priority Data
Dec. 27, 2004  (JP) ................................. 2004-377894

(51) Int. Cl.
*H04N 1/40* (2006.01)
*G06K 9/00* (2006.01)
*G06K 9/48* (2006.01)
*G06K 9/66* (2006.01)

(52) U.S. Cl. ........ 358/462; 358/448; 358/443; 382/187; 382/198; 382/190

(58) Field of Classification Search .................. None
See application file for complete search history.

(56) References Cited

U.S. PATENT DOCUMENTS

| 5,455,941 | A | * | 10/1995 | Okuno et al. | ........................ | 1/1 |
| 5,949,906 | A | * | 9/1999 | Hontani et al. | ................ | 382/177 |
| 6,667,810 | B1 | * | 12/2003 | Jeyachandran et al. | ...... | 358/1.14 |
| 2004/0165747 | A1 | * | 8/2004 | Shibaki et al. | ................ | 382/100 |

FOREIGN PATENT DOCUMENTS

JP  2003-219078 A  7/2003

* cited by examiner

*Primary Examiner* — David K Moore
*Assistant Examiner* — Marcus T Riley
(74) *Attorney, Agent, or Firm* — Rossi, Kimms & McDowell LLP

(57) ABSTRACT

An image processing apparatus which is capable of managing a large number of transfer jobs without using a large-capacity storage device. A transfer job for transferring image information input to the image processing apparatus to at least one destination is performed, and character information is extracted from the input image information. History information indicative of the execution result of the transfer job is generated, and recorded in association with the extracted character information in a storage device. At least one of at least one piece of history information and at least one piece of character information recorded in association with the history information are perused.

9 Claims, 31 Drawing Sheets

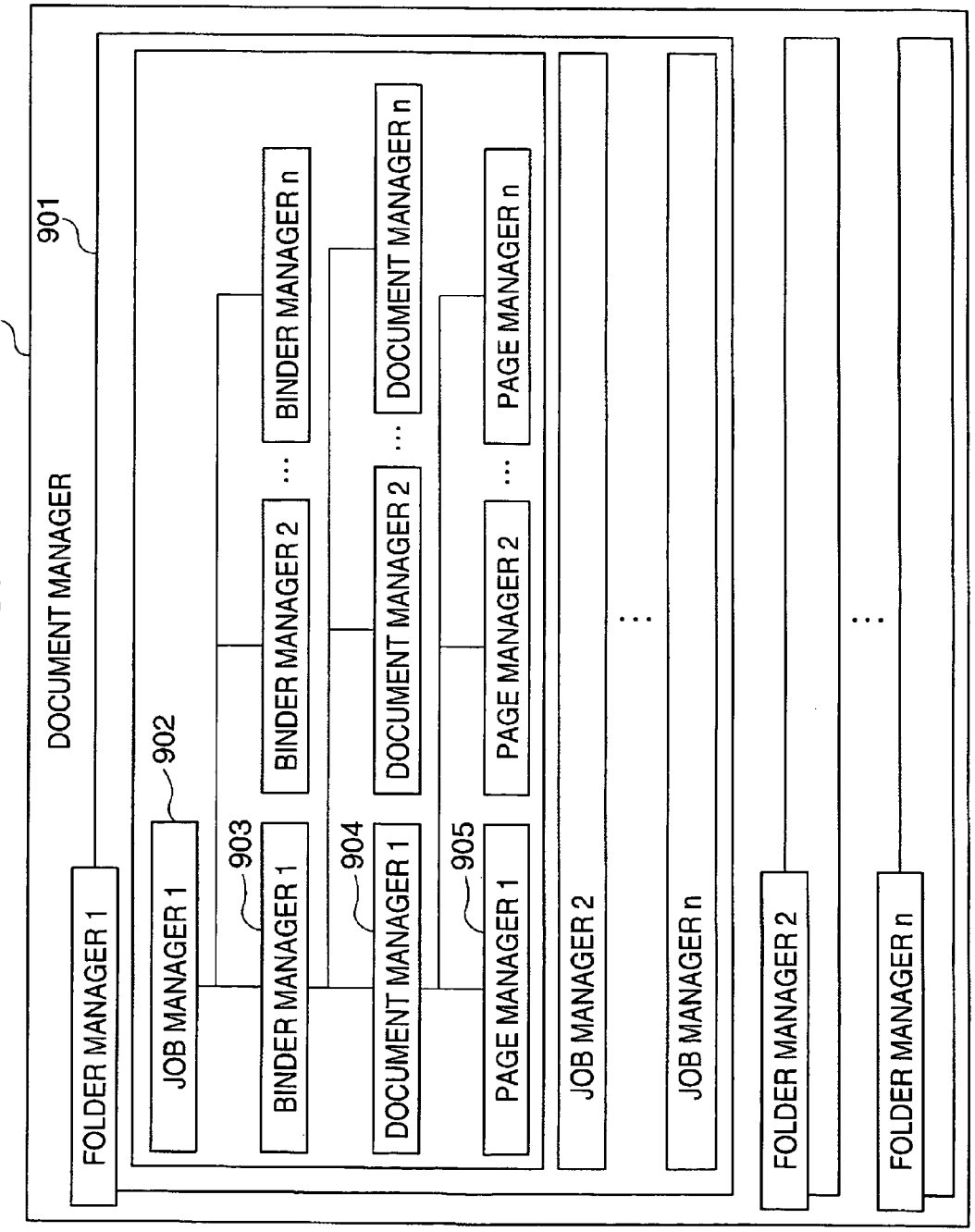

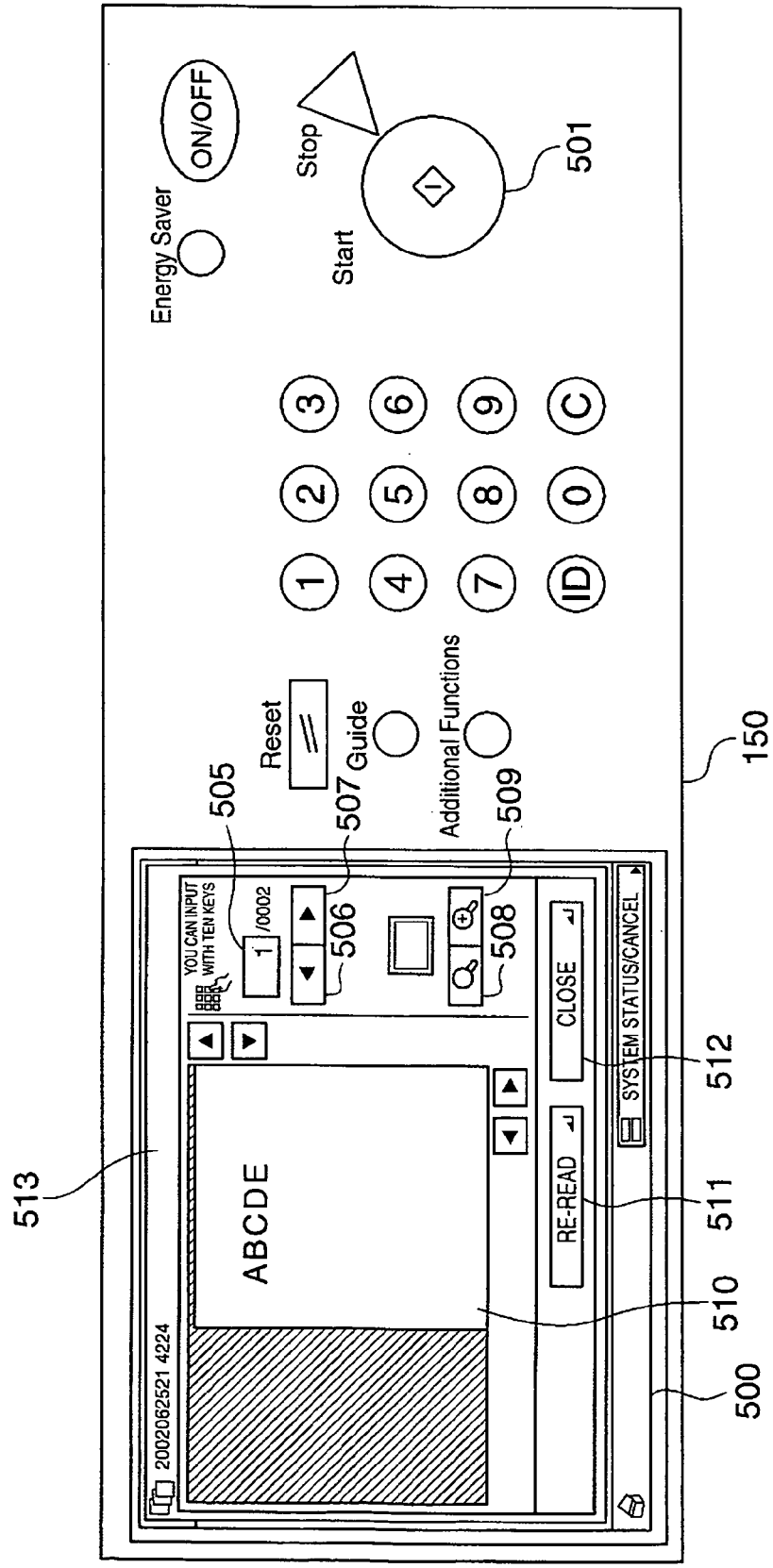

FIG. 21

```
RECEPTION NUMBER : 0002
STATUS           : COMPLETED              ┐ 3201

■ TIME RECEIVED      ▷ 2001 05/15 12:03
■ RECEIVED JOB TYPE  ▷ 📞 FAX
■ RECIPIENT          ▷ RXNAME1
■ TRANSFER JOB TYPE  ▷ 📞 FAX
■ DESTINATION        ▷ def
                     ▷ 0012345678
■ NUMBER OF PAGES    ▷ 🗋 19

[DETAILS]                      [CLOSE]  [CLOSE]
   │
  3202
```

IMAGE PROCESSING APPARATUS, TRANSFER JOB MANAGING METHOD, PROGRAM FOR IMPLEMENTING THE METHOD, AND STORAGE MEDIUM STORING THE PROGRAM

BACKGROUND OF THE INVENTION

1. Field of the Invention

The present invention relates to an image processing apparatus equipped with a transfer job performing device that performs a transfer job for transferring input image information to at least one destination, a transfer job managing method, a program for implementing the method, and a storage medium storing the program.

2. Description of the Related Art

In recent years, digital multifunction apparatuses having a plurality of functions have been developed. Some of those digital multifunction apparatuses have a copying function, a printer function, a scanner function, a server-like transfer function, etc (see Japanese Laid-Open Patent Publication (Kokai) No. 2003-219078, for example).

The digital multifunction apparatuses are so-called platforms capable of converting information on sheets used in offices into digital image data, and vice versa.

In offices, various measures are taken to ensure security. For example, output, reading, external transfer, etc. of secret documents using the digital multifunction apparatuses are typically prohibited or limited so as to prevent the leakage of the secret documents. However, there may be a case where secret documents are output, read, or externally transferred due to an error in operation by an operator.

In particular, it is necessary to minimize the likelihood that secret documents are unnecessarily leaked out, and to this end, transfer jobs for externally transferring document images have to be satisfactorily managed. Accordingly, for example, it can be envisaged that each time a transfer job is performed, an image transferred by the transfer job as well as history information indicative of the execution result of the transfer job is stored as part of history information in a storage device, so that the execution result of the transfer job is managed using the history information. According to this transfer job managing method, however, an image is stored in the storage device each time a transfer job is performed, and hence as the number of transfer jobs increases, history information stored in the storage device rapidly increases. Thus, to carry out the transfer job managing method, the storage device needs to have a very large storage capacity, and therefore it takes much cost to manage transfer jobs.

SUMMARY OF THE INVENTION

It is an object of the present invention to provide an image processing apparatus and a transfer managing method that can easily manage a large number of transfer jobs without using a large-capacity storage device, a program for implementing the method, and a storage medium storing the program.

To attain the above object, in a first aspect of the present invention, there is provided an image processing apparatus comprising a transfer job performing device that performs a transfer job for transferring image information input to the image processing apparatus to at least one destination, a character information extracting device that extracts character information from the input image information, a history information generating device that generates history information indicative of a result of execution of the transfer job by the transfer job performing device, a recording device that records the generated history information and the extracted character information in association with each other in a storage device, and a display device that is used to peruse at least one of at least one piece of history information recorded in the storage device and at least one piece of character information recorded in association with the history information.

Preferably, the display device comprises a display unit and an instruction input device that inputs a user instruction for displaying history information and a user instruction for displaying character information, and the instruction input device is operable after the history information is displayed on the display unit in response to the user instruction for displaying the history information being input, to accept input of the user instruction for displaying character information associated with the displayed history information.

More preferably, the instruction input device is operable when inputting the user instruction for displaying character information associated with the displayed history information, to request a user to input a password, and to accept input of the user instruction for displaying the character information when the password input in response to the request is an authorized password.

Preferably, the image processing apparatus comprises a first determining device that determines whether particular character information is included in the extracted character information, and a second determining device that determines whether execution of the transfer job by the transfer job performing device is inhibited or permitted in accordance with a result of the determination by the first determining device.

More preferably, the particular character information is one of character information for inhibiting execution of the transfer job and character information for permitting execution of the transfer job.

Preferably, the transfer job performing device is operable when image information received from an external apparatus by the image processing apparatus satisfies predetermined conditions, to transfer the received image information to the at least one destination.

To attain the above object, in a second aspect of the present invention, there is provided a method of managing a transfer job for transferring input image information to at least one destination comprising a character information extracting step of extracting character information from the input image information, a history information generating step of generating history information indicative of a result of execution of the transfer job, a recording step of recording the generated history information and the extracted character information in association with each other in a storage device, and a display step of perusing at least one of at least one piece of history information recorded in the storage device and at least one piece of character information recorded in association with the history information.

Preferably, in the display step, when a user gives an instruction for displaying history information, history information is displayed on a display unit, and when the user gives an instruction for displaying character information associated with the displayed history information, character information associated with the history information is displayed on the display unit.

More preferably, in the display step, when the user gives the instruction for displaying the character information associated with the displayed history information, the user is requested to input a password, and when the password input in response to the request is an authorized password, the instruction for displaying the character information is accepted.

Preferably, the transfer job managing method comprises a first determining step of determining whether particular character information is included in the extracted character information, and a second determining step of determining whether execution of the transfer job by the transfer job performing device is inhibited or permitted in accordance with a result of the determination in the first determining step.

More preferably, the particular character information is one of character information for inhibiting execution of the transfer job and character information for permitting execution of the transfer job.

Preferably, the transfer job is a transfer job that transfers image information received from an external apparatus to the at least one destination when the image information satisfies predetermined conditions.

To attain the above object, in a third aspect of the present invention, there is provided a program for causing a computer to execute a method of managing a transfer job for transferring input image information to at least one destination, comprising a character information extracting module for extracting character information from the input image information, a history information generating module for generating history information indicative of a result of execution of the transfer job, a recording module for recording the generated history information and the extracted character information in association with each other in a storage device, and a display module for perusing at least one of at least one piece of history information recorded in the storage device and at least one piece of character information recorded in association with the history information.

To attain the above object, in a fourth aspect of the present invention, there is provided an image processing apparatus comprising a transfer job performing device that performs a transfer job for transferring image information input to the image processing apparatus to at least one destination, a determining device that determines whether a predetermined object is included in the input image information, a history information generating device that generates history information indicative of a result of execution of the transfer job by the transfer job performing device, a recording device that records the history information generated by the history information generating device and the predetermined object in association with each other in a storage device when it is determined that the predetermined object is included in the input image information, and a display device that is used to peruse at least one of at least one piece of history information recorded in the storage device and at least one predetermined object recorded in association with the history information.

To attain the above object, in a fifth aspect of the present invention, there is provided a method of managing a transfer job for transferring input image information to at least one destination, comprising a determining step of determining whether a predetermined object is included in the input image information, a history information generating step of generating history information indicative of a result of execution of the transfer job, a recording step of recording the history information generated in the history information generating step and the predetermined object in association with each other in a storage device when it is determined in the determining step that the predetermined object is included in the input image information, and a display step of perusing at least one of at least one piece of history information recorded in the storage device and at least one predetermined object recorded in association with the history information.

To attain the above object, in a sixth aspect of the present invention, there is provided a program for causing a computer to execute a method of managing a transfer job for transferring input image information to at least one destination, comprising a determining module for determining whether a predetermined object is included in the input image information, a history information generating module for generating history information indicative of a result of execution of the transfer job, a recording module for recording the generated history information and the predetermined object in association with each other in a storage device when it is determined by the determining module that the predetermined object is included in the input image information, and a display module for perusing at least one of at least one piece of history information recorded in the storage device and at least one predetermined object recorded in association with the history information.

To attain the above object, according to the present invention, there is provided a storage medium that stores the program according to the above-mentioned third and sixth aspects such that the program is readable by a computer.

The above and other objects, features, and advantages of the invention will become more apparent from the following detailed description taken in conjunction with the accompanying drawings.

BRIEF DESCRIPTION OF THE DRAWINGS

FIG. 7 is a diagram showing the management structure of a document manager that manages image data stored in an image storage unit appearing in FIG. 1;

FIGS. 8A and 8B are diagrams showing an example of the structure of a copy job performed by the controller appearing in FIG. 1, in which FIG. 8A shows part of the example and FIG. 8B shows the remaining part thereof;

FIG. 12 is a view showing an example of an original reading confirmation screen displayed on the operating unit;

FIGS. 13A and 13B are flow charts showing the procedure of a sequential-reading/copying process, in which FIG. 13A shows part of the flow chart and FIG. 13B shows the remaining part thereof;

FIGS. 15A and 15B are flow charts showing the procedure of a previewing process in a step S1005 in FIG. 13B, in which FIG. 15A shows part of the flow chart and FIG. 15B shows the remaining part thereof;

FIG. 21 is a view showing in detail job history information selected on the screen in FIG. 20;

DETAILED DESCRIPTION OF THE PREFERRED EMBODIMENTS

The present invention will now be described in detail below with reference to the drawings showing preferred embodiments thereof.

A description will now be given of a first embodiment of the present invention with reference to the drawings.

Figure 1:
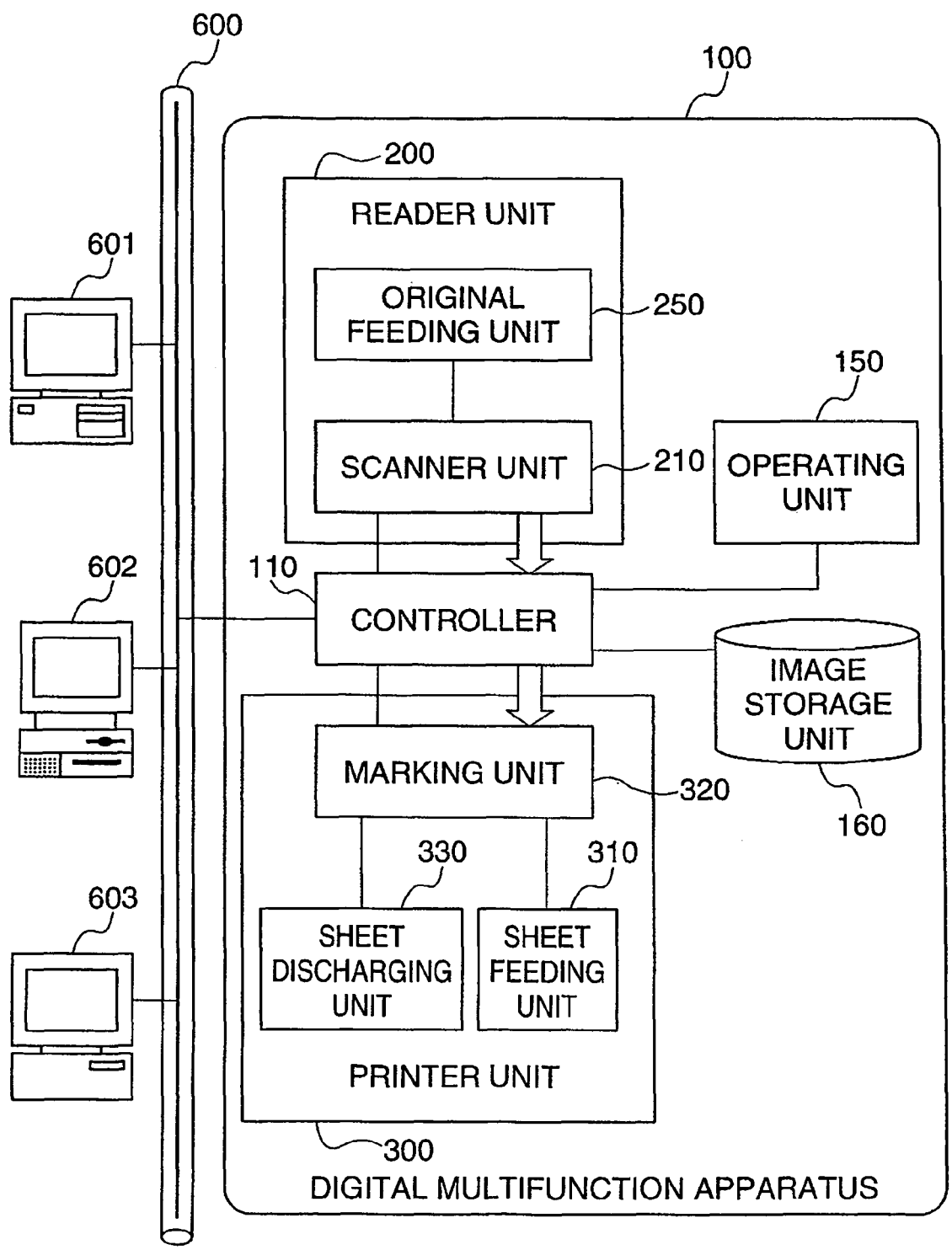
FIG. 1 is a block diagram showing the construction of an image processing apparatus (digital multifunction apparatus) according to a first embodiment of the present invention.

FIG. 1 is a block diagram showing the construction of an image processing apparatus according to the first embodiment.

In the present embodiment, it is assumed that the image processing apparatus is implemented by a digital multifunction apparatus having a plurality of functions.

As shown in FIG. 1, the digital multifunction apparatus 100 as well as a plurality of host computers (hereinafter referred to as "the PCs") 601, 602, and 603 is connected to a LAN (local area network) 600 such as an Ethernet (registered trademark) LAN. The digital multifunction apparatus 100 is comprised of a reader unit 200 for reading an image on an original, a printer unit 300 for forming an image on a sheet, an operating unit 150, an image storage unit 160, and a controller 110.

The reader unit 200 is comprised of an original feeding unit 250 that feeds originals on a sheet-by-sheet basis, and a scanner unit 210 that optically reads an image on an original fed from the original feeding unit 250, converts the read image into image data, and outputs the image data.

The printer unit 300 is comprised of a sheet feeding unit 310 having a plurality of sheet cassettes in which sheets are housed, a marking unit 320 that transfers image data to a sheet and fixes the transferred image data, and a sheet discharging unit 330 that sorts and staples sheets having images formed thereon and discharges the sheets to the outside.

The operating unit 150 includes various hard keys and a liquid crystal panel for displaying/setting image data and various functions.

The image storage unit 160 is comprised of a hard disk drive (HDD) for storing image data read by the reader unit 200, image data generated from code data received from the PCs 601, 602, and 603 by the digital multifunction apparatus 100 via the LAN 600, and so forth. A CD-R drive, a DVD-R drive, or the like may also be used as a storage device constituting the image storage unit 160.

The controller 110 controls the reader unit 200 and the printer unit 300 to provide a copying function of causing the reader unit 200 to read image data from an original and causing the printer unit 300 to form an image on a sheet based on the read image data. The controller 110 also carries out control to provide a scanner function of converting image data read from an original by the reader unit 200 into code data and transmitting the code data to the PCs 601, 602, and/or 603 via the LAN 600, a printer function of converting the code data received from the PCs 601, 602 and/or the PC 603 via the LAN 600 into image data and outputting the image data to the printer unit 300, a transfer function, and so forth. The transfer function will be described later in detail.

Figure 2:
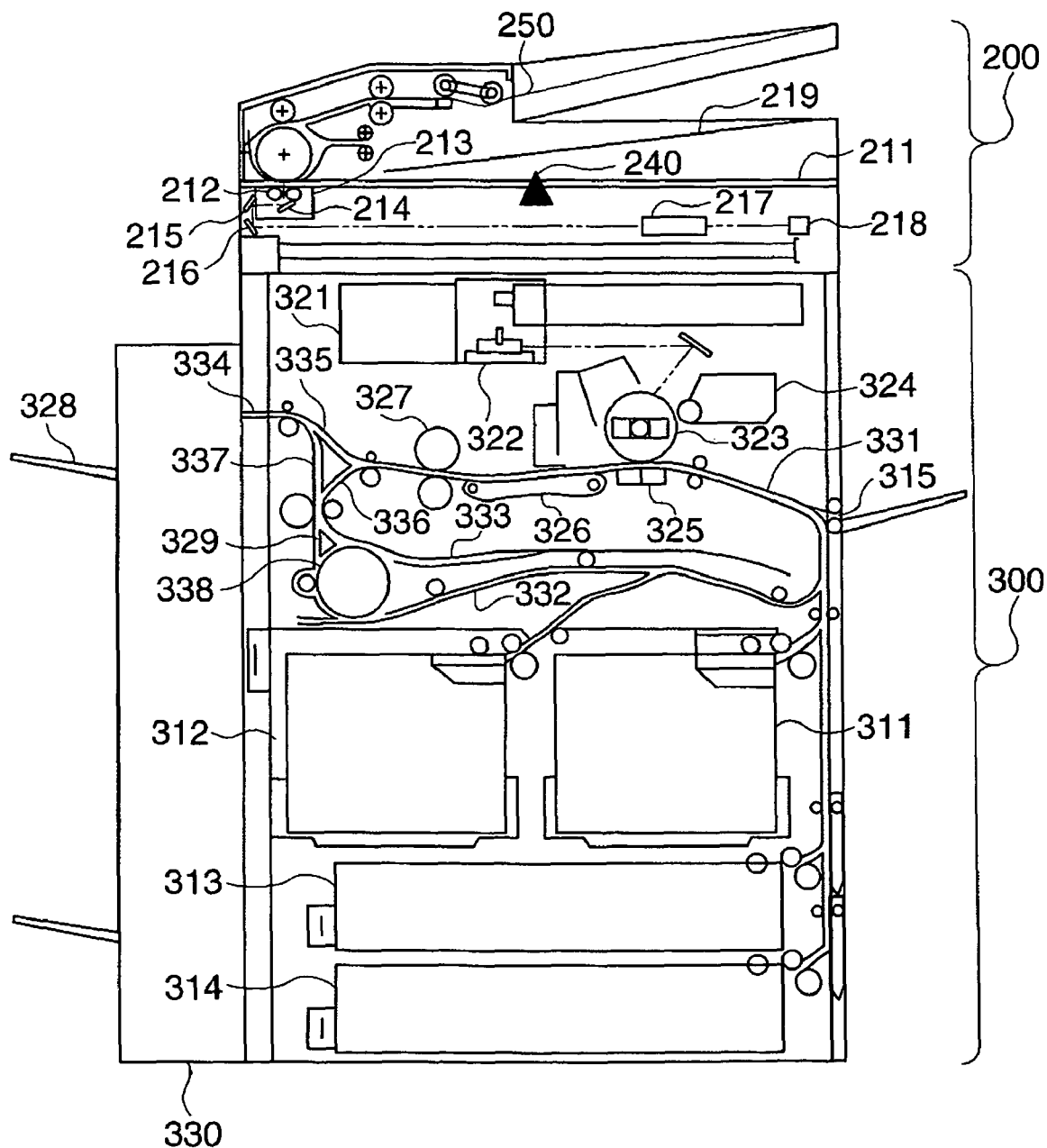
FIG. 2 is a longitudinal sectional view showing the mechanical construction of the digital multifunction apparatus in FIG. 1.

The digital multifunction apparatus 100 according to the present embodiment is comprised of the reader unit 200 and the printer unit 300, which are configured as an integral unit, and the mechanical construction thereof will now be described with reference to FIG. 2. FIG. 2 is a longitudinal sectional view showing the mechanical construction of the digital multifunction apparatus 100 in FIG. 1.

In the reader unit 200, the original feeding unit 250 feeds originals stacked thereon onto a platen glass 211 on a sheet-by-sheet basis in a predetermined order, and the scanner unit 210 (see FIG. 1) reads the originals fed onto the platen glass 211. After reading of each original is completed, the original on the platen glass 211 is discharged to a discharge tray 219.

In the reading operation carried out by the scanner unit 210, when an original is fed onto the platen glass 211, a lamp 212 for illuminating the original from below is turned on, and an optical unit 213 is caused to start moving to scan the original. Reflected light from the original is guided to a CCD image sensor (hereinafter referred to as "the CCD") 218 via a plurality of mirrors 214, 215, and 216, and a lens 217, and the CCD 218 converts a scanned image on the original into image data and outputs the image data. The image data output from the CCD 218 is subjected to predetermined processing, and the resultant image data is transferred to the controller 110 (see FIG. 1).

The reader unit 200 is also capable of carrying out moving original reading in which an original fed from the original feeding unit 250 passes through a moving original reading location 240 on the platen glass 211 at a constant speed. The optical unit 213 is moved to the moving original reading location 240 where the original being conveyed at a constant speed is illuminated by the lamp 212 and an image on the original is read by the CCD 218.

The printer unit 300 includes a laser driver 321 that drives a laser emitting section 322 in accordance with image data output from the controller 110. A laser beam emitted from the laser emitting section 322 driven by the laser driver 321 scans a photosensitive drum 323 by exposure. As a result, an electrostatic latent image corresponding to the laser beam is formed on the photosensitive drum 323, and the electrostatic latent image is visualized as a toner image by toners supplied from a developing unit 324.

In synchronization with the laser emitting section 322 starting the emission of the laser beam, the toner image is transferred onto a sheet fed from any of cassettes 311, 312, 313, and 314 or a manual sheet feed tray 315 constituting the sheet feeding unit 310 via a conveying path 331 by a transfer unit 325. The sheet onto which the toner image has been transferred is conveyed to a fixing unit 327 via a conveying belt 326. The fixing unit 327 fixes the toner image on the sheet by means of heating and pressing. The sheet that has passed through the fixing unit 327 is conveyed to a sheet discharging unit 330 via a conveying path 335 and a conveying path 334. The sheet discharging unit 330 performs sheet processing (sorting and stapling of sheets) on the sheets and discharges the sheets on which the sheet processing has been performed to a sheet discharge bin 328.

In the case where the sheet is discharged after the sheet is turned over, the sheet is guided to a conveying path 336 and a conveying path 338 and then conveyed in the reverse direction to the sheet discharging unit 330 via a conveying path 337 and the conveying path 334.

In the case of double-sided printing, the sheet that has passed through the fixing unit 327 is guided from the conveying path 336 to a conveying path 333 by a flapper 329 and then directed in the reverse direction by the flapper 329 to a sheet refeeding conveying path 332 via the conveying path 338. Thereafter, the sheet is fed to the transfer unit 325 via the conveying path 331.

Figure 3:
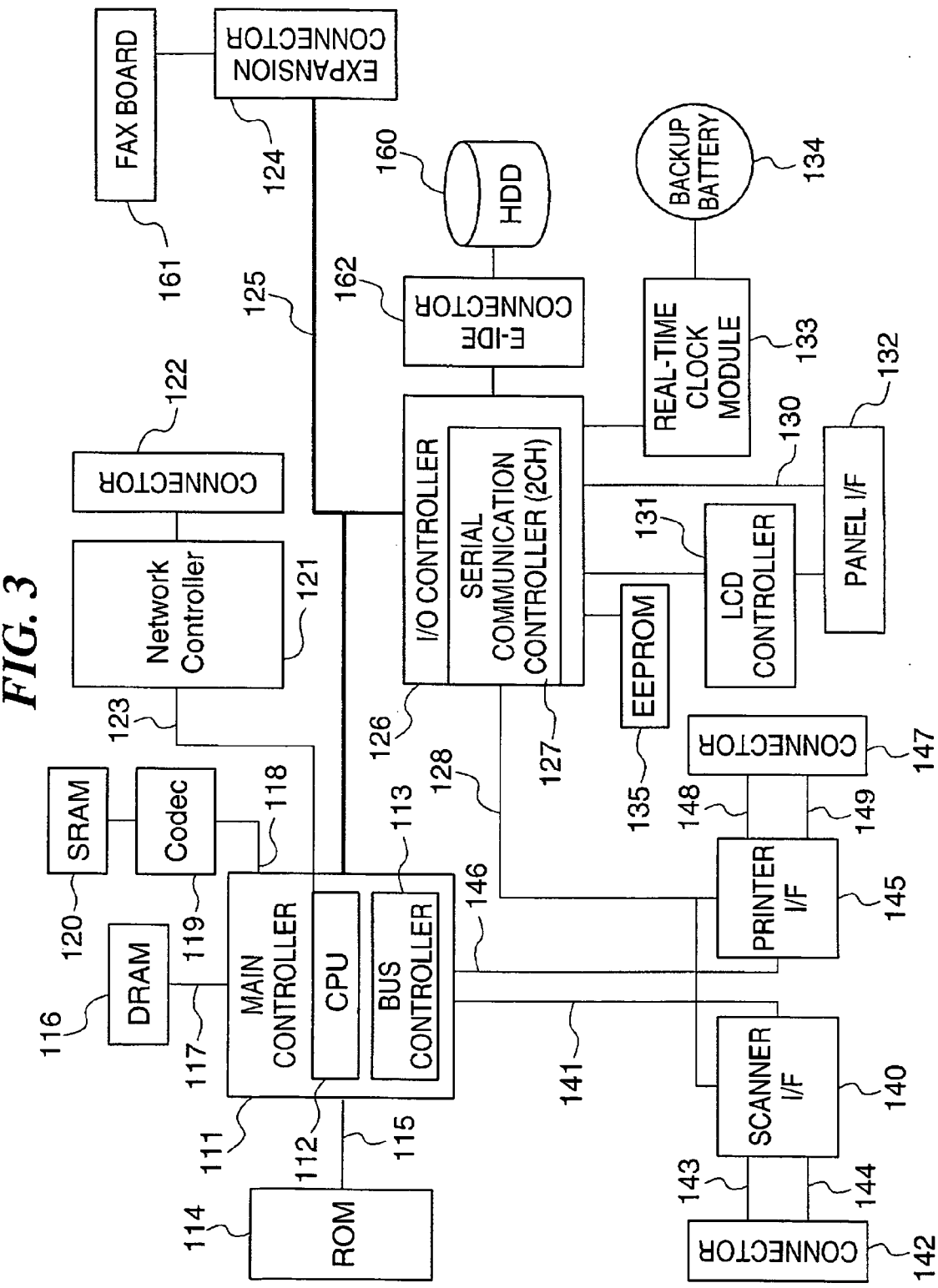
FIG. 3 is a block diagram showing the internal construction of a controller appearing in FIG. 1.

Referring next to FIG. 3, a detailed description will be given of the controller 110 appearing in FIG. 1. FIG. 3 is a block diagram showing the internal construction of the controller 110.

As shown in FIG. 3, the controller 110 incorporates therein a main controller 111. The main controller 111 includes a CPU 112, a bus controller 113, and a functional block, not shown, having various controller circuits, described later. The controller 110 is connected to a ROM 114 via a ROM I/F 115, to a DRAM 116 via a DRAM I/F 117, to a codec 119 via a codec I/F 118, and to a network controller 121 via a network I/F 123.

The ROM 114 stores various control programs executed by the CPU 112 of the main controller 111 and computation data. The DRAM 116 is used as a work area for use by the CPU 112, and is also used to store image data. The codec 119 compresses raster image data stored in the DRAM 116 using a known compression method such as MH, MR, MMR, or JBIG, and decompresses compressed data into raster image data. The codec 119 is connected to an SRAM 120, which is used by the codec 119 as a temporary work area. The network controller 121 is connected to the LAN 600 appearing in FIG. 1 via a connector 122, for carrying out predetermined control of communication with the LAN 600.

The main controller 111 is also connected to a scanner I/F 140 via a scanner bus 141, to a printer I/F 145 via a printer bus 146, and to an expansion connector 124 for connection to an expansion board and an input/output controller (I/O controller) 126 via a general-purpose high-speed bus 125 such as a PCI bus.

In the present embodiment, a FAX board 161 for transmission and reception of facsimiles via a telephone line is connected to the expansion connector 124. The I/O controller 126 includes a 2-channel asynchronous serial communication controller 127 for transmitting and receiving control commands to and from the reader unit 200 and the printer unit 300 appearing in FIG. 1. The serial communication controller 127 is connected to the scanner I/F 140 and the printer I/F 145 via an I/O bus 128.

The scanner I/F 140 is connected to a scanner connector 143 via a first asynchronous serial I/F 143 and a first video I/F 144. The scanner connector 142 is connected to the scanner unit 210 of the reader unit 200. The scanner I/F 140 performs binarization and scaling up/down in the main scanning direction and/or in the sub-scanning direction on image data received from the scanner unit 210, produces a control signal based on a video signal received from the scanner unit 210, and transfers the resultant image data and control signal to the main controller 111 via the scanner bus 141.

The printer I/F 145 is connected to a printer connector 147 via a second asynchronous serial I/F 148 and a second video I/F 149. The printer connector 147 is connected to the marking unit 320 of the printer unit 300. The printer I/F 145 performs smoothing on image data output from the main controller 111 and outputs the resultant image data to the marking unit 320. The printer I/F 145 also outputs a control signal produced based on a video signal received from the marking unit 320 to the printer bus 146.

The CPU 112 operates in accordance with control programs loaded from the ROM 114 via the ROM I/F 115. For example, the CPU 112 interprets PDL (page description language) data received from the PC 601, 602, or 603 and expands the received PDL data into raster image data.

The bus controller 113 controls the transfer of data that is input from and output to external apparatuses connected to the scanner I/F 140, the printer I/F 145, the expansion connector 124, etc. More specifically, the bus controller 113 performs arbitration when there is a bus conflict and controls DMA data transfer. For example, the data transfer between the DRAM 116 and the codec 119, the data transfer from the scanner unit 210 to the DRAM 116, and the data transfer from the DRAM 116 to the marking unit 320 described above are carried out under the control of the bus controller 113.

The I/O controller 126 is connected to a panel I/F 132 via an LCD controller 131 and a key input I/F 130. The panel I/F 132 is connected to the operating unit 150 appearing in FIG. 1. The I/O controller 126 is connected to an EEPROM 135 that is a non-volatile memory, to the image storage unit (HDD) 160 to and from which image data can be written and read out via an E-IDE connector 162, and to a real-time clock module 133 that updates/stores date and time managed in the digital multifunction apparatus 100. The real-time clock module 133 is connected to and backed up by a backup battery 134.

Figure 4:
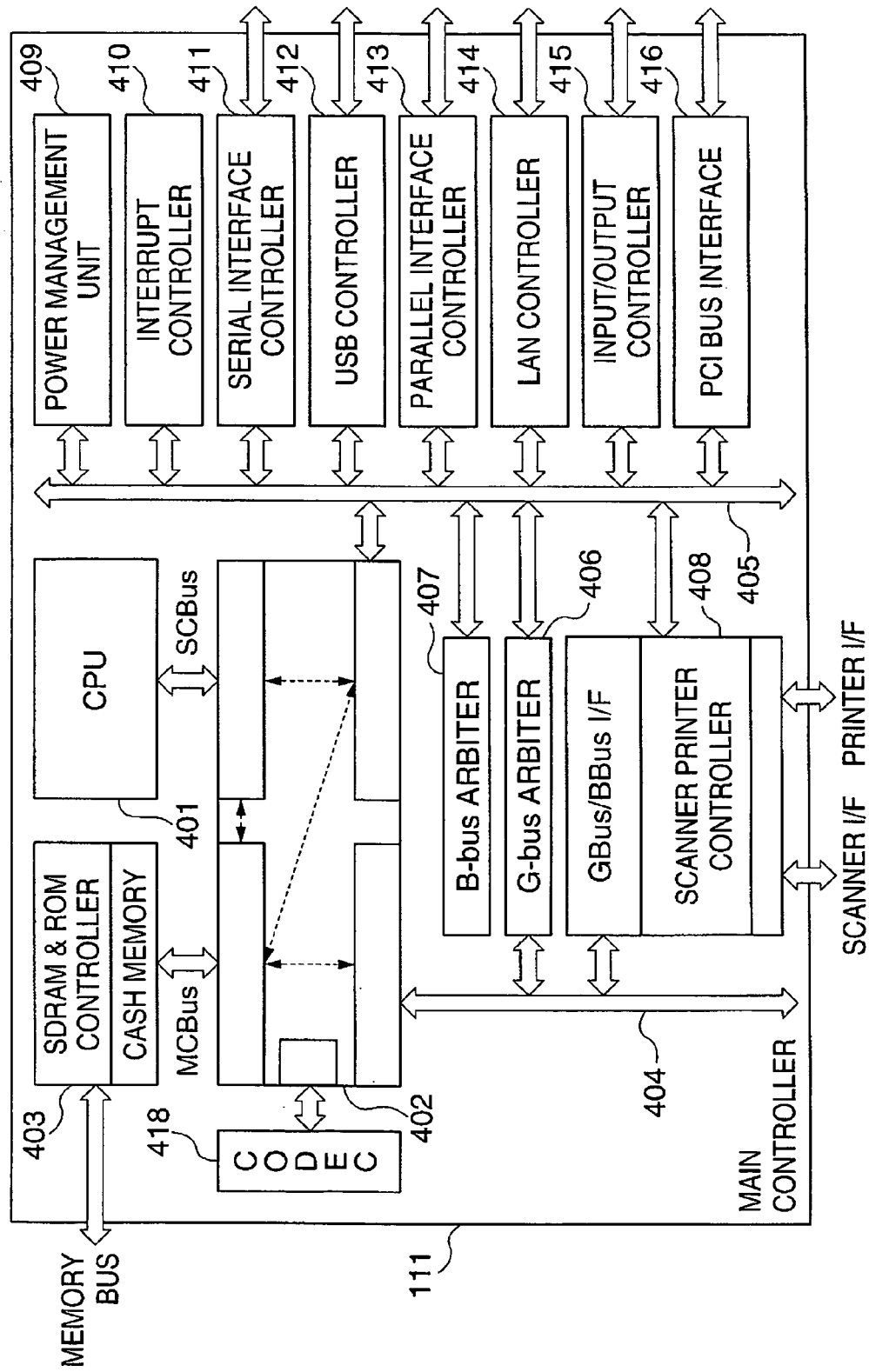
FIG. 4 is a block diagram showing the internal construction of a main controller appearing in FIG. 3.

Referring next to FIG. 4, a detailed description will be given of the main controller 111. FIG. 4 is a block diagram showing the internal construction of the main controller 111 appearing in FIG. 3.

As shown in FIG. 4, the main controller 111 includes a processor core 401 constituting the CPU 112. The processor core 401 is connected to a system bus bridge (SBB) 402 via a 64-bit processor bus (SC-bus). The SBB 402 is a 4×4 64-bit crossbar switch connected to a total of four buses, i.e., the SC-bus for connection with the processor core 401, a local bus (MC-bus) dedicated to connection with a memory controller 403 that is provided with a cash memory and controls an SDRAM or a ROM, a graphic bus (G-bus) 404, and an IO bus (B-bus) 405. The SBB 402 is designed to ensure simultaneous parallel connection between the four modules as far as possible. The SBB 402 is also connected to a data compression/expansion unit (CODEC) 418 via a CODEC I/F.

The G-bus 404 is cooperatively controlled by a G-bus arbiter (GBA) 406, and is connected to a scanner/printer controller (SPC) 408 for connection with a scanner or a printer. The B-bus 405 is cooperatively controlled by a B-bus arbiter (BBA) 407, and is connected to a power management unit (PMU) 409, an interrupt controller (IC) 410, a serial interface controller (SIC) 411 using a UART, a USB controller 412, an IEEE 1284 parallel interface controller (PIC) 413, an Ethernet (registered trademark) LAN controller (LANC) 414, a general-purpose input/output controller (MISC) 415, and a PCI bus interface (PCIC) 416, as well as the SPC 408.

The B-bus arbiter 407 carries out arbitration to cooperatively control the B-bus 405. If the B-bus arbiter 407 receives a request to use the B-bus 405, the B-bus arbiter 407 carries out arbitration such that one selected master is enabled to use the B-bus 405. This prevents the B-bus 405 from being accessed by two or more masters at the same time. For the purpose of arbitration, three priority levels are defined, and each master is assigned one of those three priority levels.

The interrupt controller 410 collects interrupts from outside the above described various functional blocks and the controller 110 and redistributes them as interrupts to the controllers 408 and 411 to 416 that are supported by the CPU 401 and nonmaskable interrupts (NMI).

The power management unit 409 manages electric power with respect to each functional block and monitors the power consumption of the controller 110. Specifically, the controller 110 is comprised of a large-scale ASIC (application specific integrated circuit) having the CPU 401 incorporated therein. For this reason, if all the functional blocks in the controller 110 operate at the same time, a large amount of heat is generated, which may break the controller 110. To obviate this, the power management unit 409 performs power management on a block-by-block basis, and gathers power consumptions of respective functional blocks as power management levels. The power management unit 409 adds the power consumptions together to calculate a total power consumption, and controls the power consumption of each functional block so that the total power consumption can be kept lower than the maximum allowable value.

The G-bus arbiter 406 cooperatively controls the G-bus 404 by means of a centralized arbitration, uses request signals and enable signals that are uniquely defined for the respective bus masters. Priorities are assigned to the respective masters selectively in either an equal arbitration mode in which priority is equally assigned to all the bus masters or a priority arbitration mode in which, of various bus masters, a particular bus master is assigned a high priority.

Figure 5:
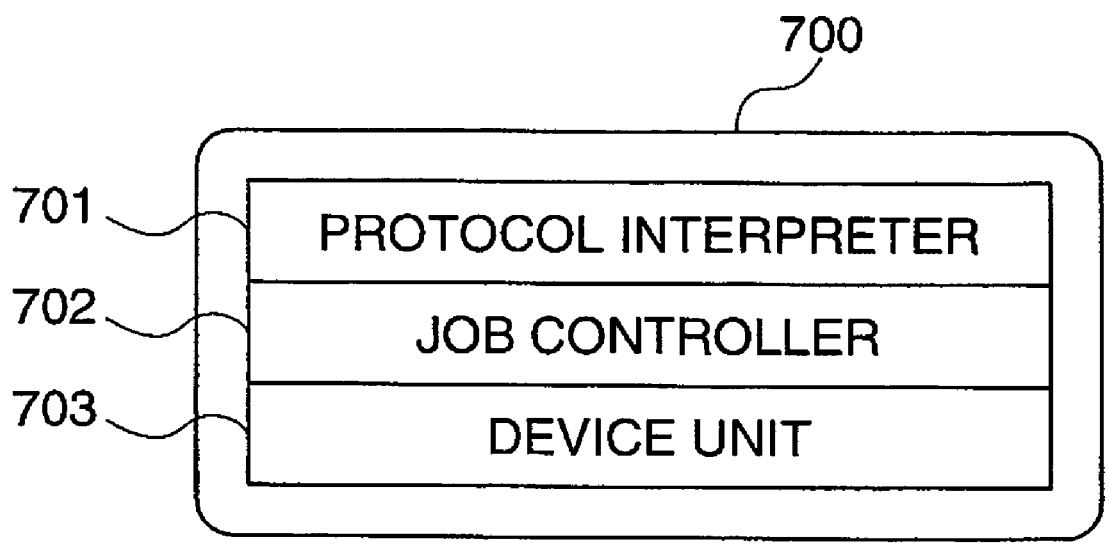
FIG. 5 is a block diagram showing the internal software configuration of the controller appearing in FIG. 1.
Figure 6:
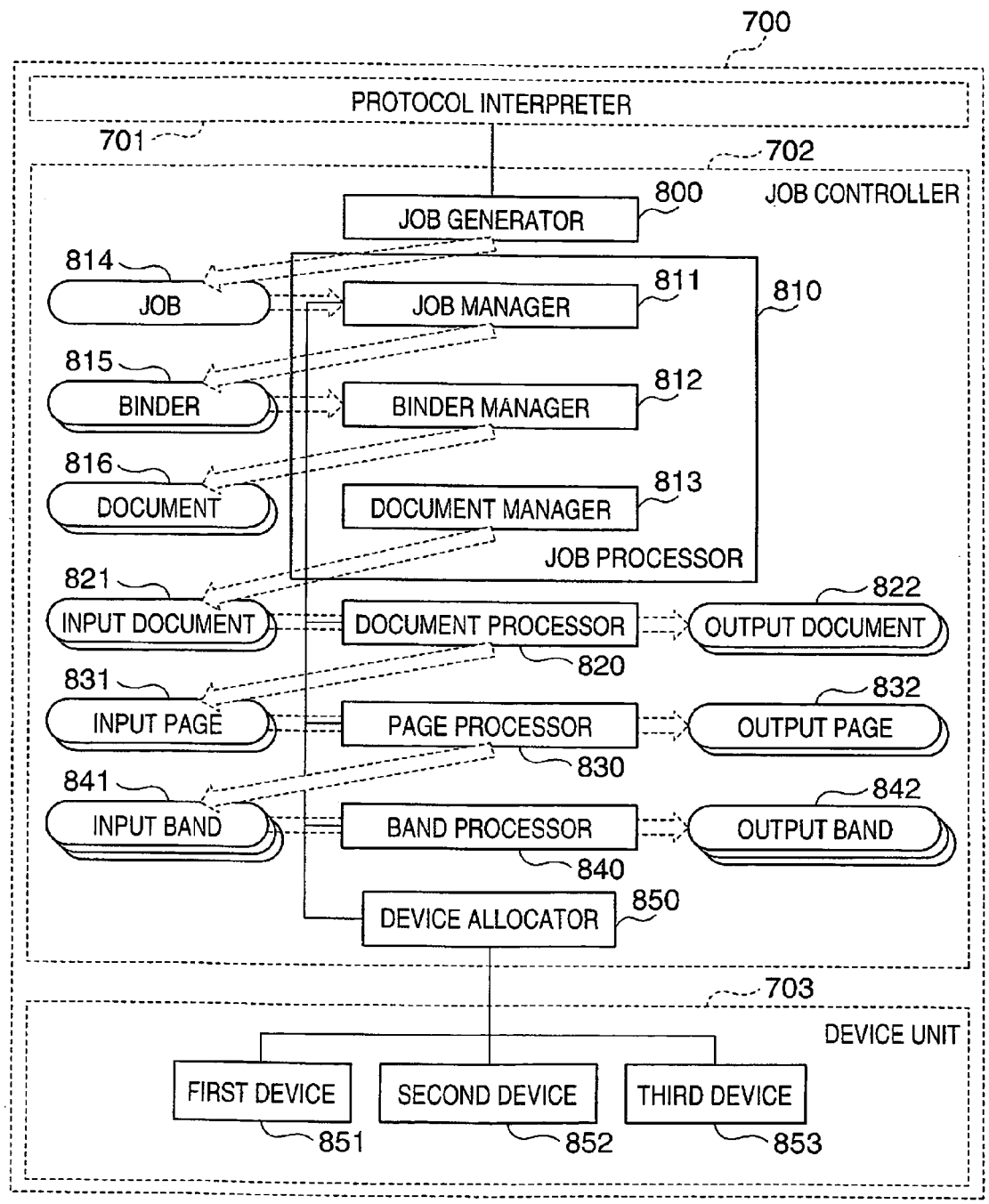
FIG. 6 is a block diagram showing the constructions of a job controller and a device unit appearing in FIG. 5.

Referring next to FIGS. 5 and 6, a description will be given of the internal software configuration of the controller 110. FIG. 5 is a block diagram showing the internal software configuration of the controller 110 appearing in FIG. 1, and FIG. 6 is a block diagram showing a job controller and a device unit appearing in FIG. 5.

As shown in FIG. 5, the controller 110 is comprised of a protocol interpreter 701, a job controller 702, and a device unit 703, which are implemented by controller software 700.

The protocol interpreter 701 interprets a command (protocol) received from any of the PCs 601, 602, and 603 or the operating unit 150 via a corresponding one of the interfaces 411 to 414, and requests the job controller 702 to perform a job. The job controller 702 performs various jobs in accordance with requests from the job controller 701. The device unit 703 includes driver software for controlling the device units constituting the digital multifunction apparatus 100. The driver software is used by the job controller 702 in performing a job.

As shown in FIG. 6, the job controller 702 includes a job generator 800, a job processor 810, a document processor 820, a page processor 830, a band processor 840, and a device allocator 850. The job processor 810 includes a job manager 811, a binder manager 812, and a document manager 813. The device unit 703 includes a plurality of devices such as a first device 851, a second device 852, and a third device 853.

A series of requests for operations from the PC 601, 602, or 603 or the operating unit 150 are input in the form of a command (protocol) to the protocol interpreter 701 via a corresponding one of the interfaces 411 to 414. The input command is interpreted by the protocol interpreter 701 and then supplied to the job generator 800 of the job controller 702. On this occasion, the command is converted into a form that can be understood by the job controller 702.

In accordance with the command interpreted by the protocol interpreter 701, the job generator 800 generates a job 814. Examples of the job 814 include a copy job, a print job, a scan job, and a facsimile job. Examples of the protocol interpreted by the protocol interpreter 701 include various setting information indicative of the name of a document to be printed, the number of copies, and the sheet discharge tray to which the printed sheets are to be discharged, as well as print data (PDL data). The generated job 814 is sent to the job processor 810, which processes the received job 814.

The job processor 810 for making settings and processing associated with the entirety of the job 814 includes a job manager 811 that makes settings associated with the entirety of the job 814 such as the order in which a plurality of binders 815 constituting the job 814 are output, a binder manager 812 that makes settings associated with the entirety of the binder 815 such as the order in which a plurality of documents 816 constituting the binder 815 are output, and a document manager 813 that makes settings associated with the entirety of the document 816 such as the order in which a plurality of pages 831 constituting the document 816 are output. In addition to making the settings and processing associated with the entirety of the job 814, the job processor 810 performs processing of dividing the job 814 into the binders 815 which are smaller portions constituting the job 814, and dividing each binder 815 into the documents 816 that are smaller portions constituting the binder 815.

Each document 816 is related to a corresponding input document 821 on a one-to-one basis. The document processor 820 converts each input document 821 into an output document 822. For example, in the case of a scan job in which a set of originals is read by the reader unit 200 and a plurality of images that have been read are converted into respective pieces of image data, the input document 821 includes written data indicative of the settings associated with the set of the originals and operational procedures to be performed, and the output document 822 includes written data indicative of the setting(s) settings associated with the set of the image data and operational procedures to be performed. The document processor 820 serves to convert a plurality of images read from a set of originals into respective pieces of image data.

The document processor 820 converts the input documents 821 into the output documents 822 on a document-by-document basis, and divides the document 816 into a plurality of still smaller portions called input pages 831 that do not relate to the setting(s) associated with the entirety of the document 816, and requests the page processor 830 to process the pages 831. This is similar to dividing of a job into binders 815 and further into documents 816 when the job processor 810 processes each job. A specific example of document-level setting/processing is setting/processing associated with the order of pages such as sorting of pages, selection of double-sided printing, addition of a cover page, and OHP insertion.

The page processor 830 converts each input page 831 into an output page 832. For example, in the case of the scan job described above, each input page 831 includes written data indicative of setting/procedure such as the reading resolution and the reading direction (landscape or portrait), while each output page 832 includes written data indicative of setting/procedure such as the storage location where the image data is to be stored.

In the case where a job is divided into smaller and smaller portions finally into pages as described above, the system has a page memory having a storage capacity of one page, resulting in an increase in costs, but it is unnecessary to further divide each page into smaller portions. In actuality, however, when the system cannot have a page memory having a storage capacity of one page in view of, for example, costs of the memory, the job 814 is processed using a memory (band memory) having a small storage capacity of a few lines. In this case, each page is further divided into a plurality of portions called bands. More specifically, the band processor 840 converts each input band 841 into an output band 842 in a manner similar to the manner in which each page is processed.

When the job processor 810, the document processor 820, the page processor 830, and the band processor 840 perform processing, they use various physical devices in the image input/output system 100. It is a matter of course that, if a plurality of these processors operate at the same time, competition occurs in terms of usage of the various physical devices. The device allocator 850 arbitrates the use of the devices. The first to third devices 851 to 853 illustrated for example are logical devices allocated to the above processors by the device allocator 850. Examples of such devices include a page memory, a band memory, the original feeding unit 250, the marking unit 320, and the scanner unit 210.

Referring next to FIG. 7, a description will be given of a document manager 900 that manages image data stored in the image storage unit 160 appearing in FIG. 1. FIG. 7 is a diagram showing the management system configuration of the document manager 900.

As shown in FIG. 7, the document manager 900 is comprised of folder managers 901, job managers 902, binder managers 903, document managers 904, and page managers 905, each of which has its own management information (attribute value). Specifically, the document manager 900 is comprised of one or more folder managers 901 and stores management information associated with the one or more folder managers 901. Each folder manager 901 is comprised of one or more job managers 902 and stores management information associated with the one or more job managers 902. Each job manager 902 is comprised of one or more binder managers 903 and stores management information associated with the one or more job managers 903. Also, each job manager 902 can store/save attribute information that is stored in the job manager 811 and required in processing the job 814 by the job controller 702 appearing in FIG. 6.

Each binder manager 903 is comprised of one or more document managers 904 and stores management information associated with the one or more document managers 904. Also, each binder manager 903 can store/save attribute information that is stored in the binder manager 812 and required in processing the binder 815 by the job controller 702.

Each document manager 904 is comprised of one or more page managers 905 and stores management information associated with the one or more page managers 905. Also, each document manager 904 can store/save attribute information that is stored in the document manager 813 and required for processing on the document by the job controller 702 and also store attribute information associated with the output document 822 processed by the document processor 820. The page manager 905 is made correspond to image data of one page that has been read by the reader unit 200, image data of one page that has been obtained by expanding PDL transmitted from the host computer 601, 602, or 603, image data of one page received by the FAX board 161, or the like. Each page manager 905 can store attribute information associated with an output page 832 processed by the page processor 830 of the job controller 702. Thus, it is possible to reproduce the job 814, which has been inputted at the time of image storage, from information stored in the document manager 900 and image data stored in the image storage unit 160. It is also possible to perform the job in a manner different from that specified at the time of the job being inputted, by resetting the stored information.

Figure 8A:
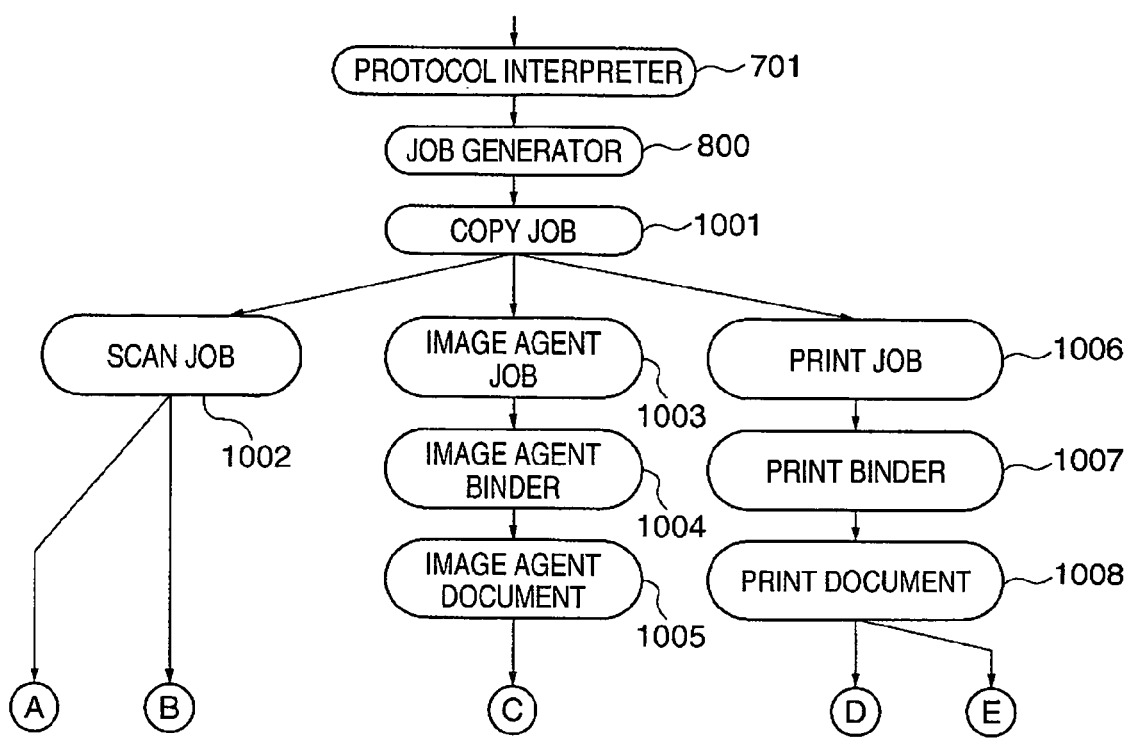
Figure 8B:
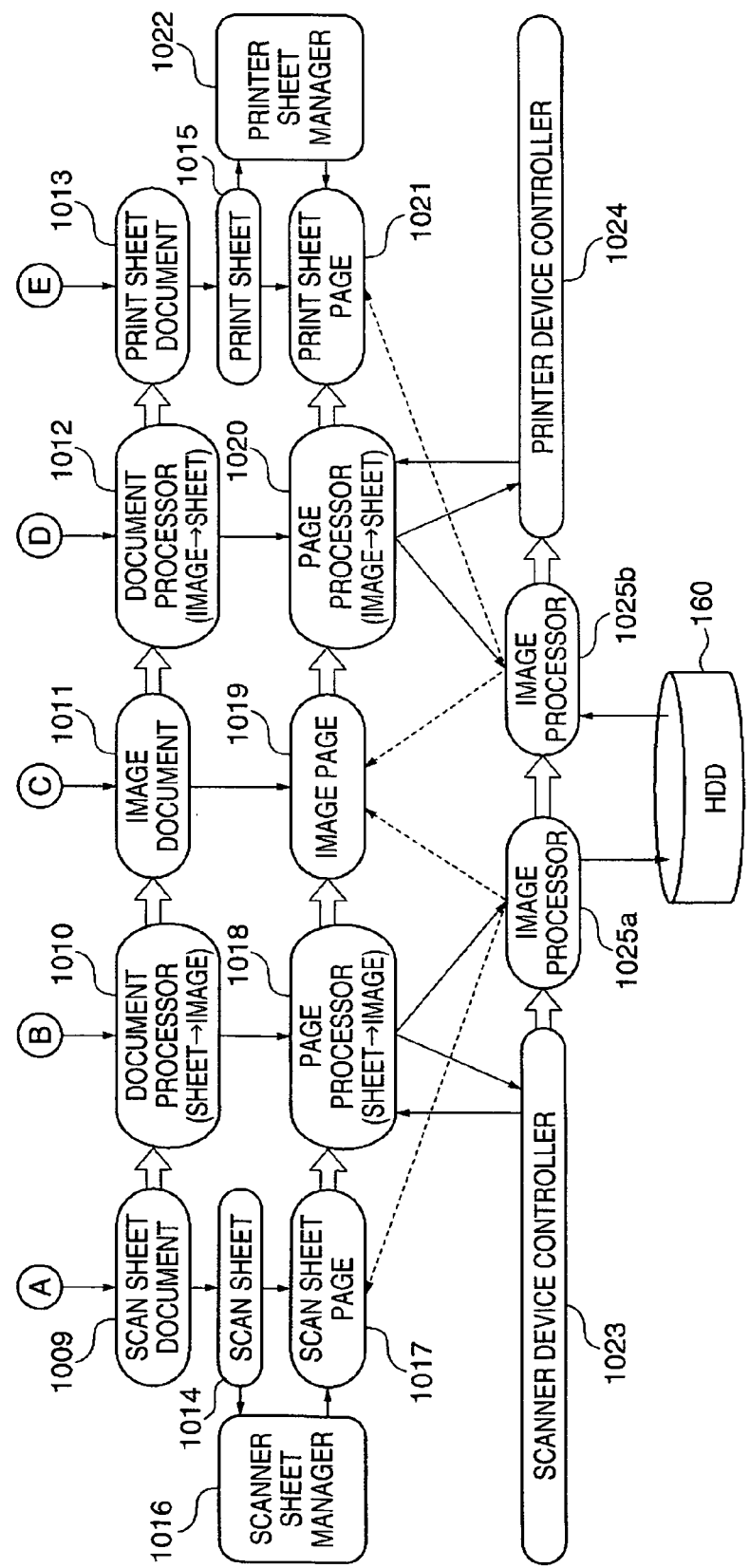

Referring next to FIGS. 8A and 8B, a description will be given of a copy job, which is one of jobs 814 performed by the controller 110. FIGS. 8A and 8B are diagrams showing an example of a copy job performed by the controller 110 appearing in FIG. 1.

When receiving a series of requests for operations in the form of a command for performing a copy job from the host computer 601, 602, or 603, or from the operating unit 160, the protocol interpreter 701 interprets the received command, converts the interpreted command into a form that can be understood by the job generator 800, and sends the resulting command to the job generator 800 as shown in FIG. 8A. The job generator 800 generates a copy job 1001 in accordance with the received command. The copy job 1001 has a function of carrying out a copying process. The copy job 1001 thereby generates a scan job 1002, an image agent job 1003, and a print job 1006, and realizes the copying process by controlling operations associated with those produced jobs. The image agent job 1003 requests agent binders 1004 to perform the details of the process, and each image agent binder 1004 requests image agent documents 1005 to perform the further details of the process, and so on. The image agent job 1003 controls the agent binders 1004 each of which controls the image agent documents 1005. The image agent document 1005 produces an image document 1011, which is an output document to be output by a document processor (sheet→image) 1010. The produced image document 1011 is sent to the scan job 1002 and the print job 1006 via the image agent binder 1004, the image agent job 1003, and the copy job 1001.

The scan job 1002 produces a scan sheet document 1009, which is an input document to be input to the document processor (sheet→image) 1010, and then produces the document processor (sheet→image) 1010. At this time, the document processor (sheet→image) 1010 is informed that the scan sheet document 1009 is specified as the input document and the image document 1011 is specified as the output document. Thereafter, the scan job 1002 requests the document processor (sheet→image) 1010 to perform processing on the scan sheet document 1009 and controls the operation of the document processor (sheet→image) 1010.

In the scan job 1002, the job processor 810 performs setting/processing associated with the entirety of the scan job 1002 and also performs setting/processing associated with binders. In the scan job 1002, the physical structures of the scanner unit 210 and the scanner original unit 250 allow one scanning operation to be controlled by one job, one binder, and one document, and thus, in the present embodiment, the binder 815 and the document 816 are omitted.

In the scan sheet document 1009, information associated with an original is managed in the form of attribute information, and in the image document 1011, information associated with image data obtained by reading is managed in the form of attribute information. Based upon the attribute information, the document processor (sheet→image) 1010 controls the process of converting the scan sheet document 1009 given as the input document into the image document 1011 specified as the output document. The document processor (sheet→image) 1010 performs only processing on a document-by-document basis, and details of the processing are performed by a scan sheet page 1017, a page processor (sheet→image) 1018, and an image page 1019. The scan sheet document 1009 sequentially produces scan sheets 1014 corresponding in number to the number of originals. When a scan sheet 1014 is produced, an identifier thereof is registered in a scanner sheet manager 1016 that manages the order in which originals are processed. Thereafter, the scan sheet 1014 generates a scan sheet page 1017. The scan sheet page 1017 corresponds to a front-side page or a rear-side page of an original. In the case of a double-sided original, each scan sheet 1014 produces two scan sheet pages 1017.

Based on the identifier of the scan sheet 1014 and device specifications (such as the original reading order), the scanner sheet manager 1016 determines the order in which processing is performed on scan sheet pages 1017. In the scan sheet page 1017, information relating to the corresponding page of the original is managed, and in the image page 1019 produced by the image document 1011, information relating to read image data of the corresponding page is managed. The page processor (sheet→image) 1018 controls the process of converting the scan sheet page 1017 given as an input page into the image page 1019 specified as an output page. The page processor (sheet→image) 1018, which grasps a process sequence for controlling the physical scanner device, controls an original reading operation (scan operation) by issuing an engine control command prepared in advance to a scanner device controller 1023. Also, the attribute information managed in the scan sheet page 1017 and the image page 1019 are set in an image processor 1025a, which is then controlled, so that the read original is stored as image data in the image storage unit 160.

The document manger 900 manages the stored image data. The stored image data can be, for example, read, copied, moved, and deleted via the document manager 900. The image processors 1025a and 1025b include control associated with resolution conversion, code conversion, etc.

On the other hand, the print job 1006 performs setting/processing associated with the entire print job, and divides itself into print binders 1007 as a plurality of portions. Each of the print binders divides itself into print documents 1008 as a plurality of still smaller portions, and performs setting/processing associated with the entire print processing. The print document 1008 produces a print sheet document 1013 as an output document to be output from a document processor (image→sheet) 1012, and then produces the document processor (image→sheet) 1012. At this time, the image document 1011 specified as the input document and the print sheet document 1013 specified as the output document are sent to the document processor (image→sheet) 1012. The print document 1008 requests the document processor (image→sheet) 1012 to perform processing and controls the operation of the same.

In the print sheet document 1013, attribute information associated with print output is managed, and in the image document 1011, attribute information associated with image data is managed. In accordance with these pieces of attribute information, the document processor (image→sheet) 1012 controls the process of converting the image document 1011 given as the input document into the print sheet document 1013 specified as the output document. The document processor (image→sheet) 1012 performs only processing associated with the document as a whole, and details of the processing are performed by the image page 1019, a page processor (image→sheet) 1020, and a print sheet page 1021, which handle smaller job portions.

The print paper document 1013 sequentially produces print sheets 1015 corresponding in number to the number of pages to be printed. When each print sheet 1015 is produced, the print sheet 1015 registers its identifier in a print sheet manager 1022 that controls the order of printing, and the print sheet 1015 produces a print sheet page 1021. The print sheet page 1021 corresponds to a front-side page or a rear-side page of an output sheet. In the case of double-sided printing, each print sheet 1015 produces two print sheet pages 1021. The print sheet manager 1022 determines the order in which the print sheet pages 1021 are processed based upon the identifiers of the print sheets 1015 and the specifications (such as the number of sheets internally circulated, and the order in which sheets are processed in double-sided output) of the device.

In each print sheet page 1021, information associated with the page to be printed is managed, and in the image page 1019 and information associated with image data of the page is managed. The page processor (image→sheet) 1020 controls the process of converting the image page 1019 given as the input page into the print paper page 1021 specified as the output page. The page processor (image→sheet) 1020, which grasps the process sequence performed by the physical printer device, controls the printing operation by issuing an engine control command prepared in advance to a printer device controller 1024. Also, the attribute information managed in the image page 1019 and the print paper page 1021 are set in the image processor 1025b, which is then controlled, so that the image data stored in the image storage unit 160 are printed on printing sheets.

The copying operation is accomplished by the above described series of operations in which the job is divided into smaller and smaller portions and processed by the corresponding processors.

Figure 9:
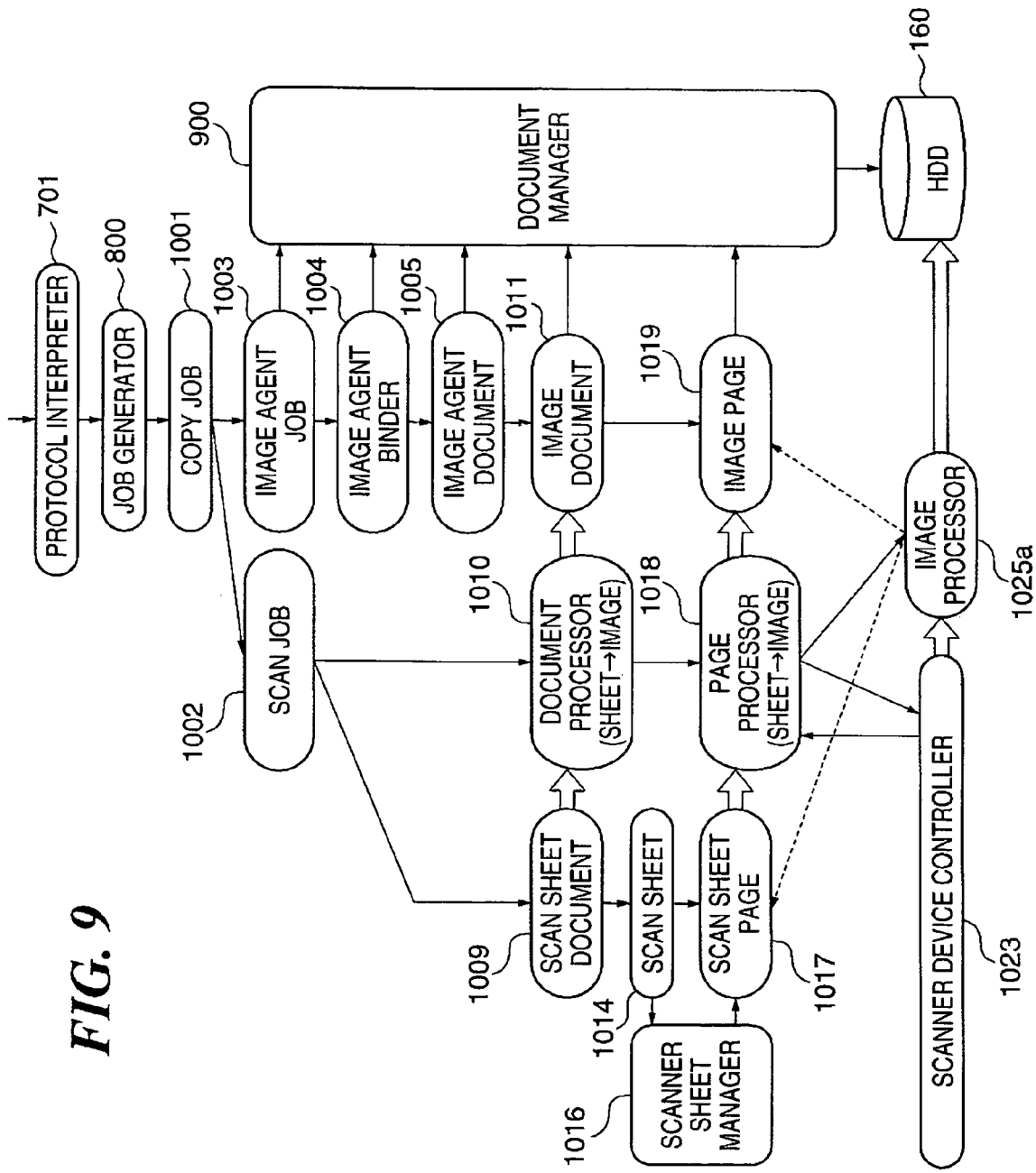
FIG. 9 is a diagram showing an example of a manner in which attribute information is stored in the document manager when a copy job is performed.

Referring next to FIG. 9, a description will be given of an example in which attribute information is stored in the document manager 900 when a copy job is performed, which is not shown in FIGS. 8A and 8B. FIG. 9 is a diagram showing an example of a manner in which attribute information is stored in the document manager 900 when a copy job is performed.

As descried above with reference to FIG. 7, the document manager 900 includes the folder managers 901, the job managers 902, the binder managers 903, the document managers 904, and the page managers 905, each of which has its own management information (attribute value). The attribute information, which is stored in the job manager 811 and required in processing the job 814 by the job controller 702, is stored/saved in the job manager 902 of the document manager 900 by the image agent job 1003. The attribute information, which is stored in the binder manager 812 and required in processing the job 815 by the job controller 702, is stored/ saved in the binder manager 903 of the document manager 900 by the image agent binder 1004. The attribute information, which is stored in the document manager 813 and required in processing the job controller 702, and the attribute information associated with the output document 822 processed by the document processor 820 are stored/saved in the document manager 904 of the document manager 900 by the image document 1011 corresponding to the output document. The attribute information associated with the output page 832 processed by the page processor 830 of the job controller 702 is stored/saved in the page manager 905 of the document manager 900 by the image page 1019 corresponding to the output page.

Figure 10:
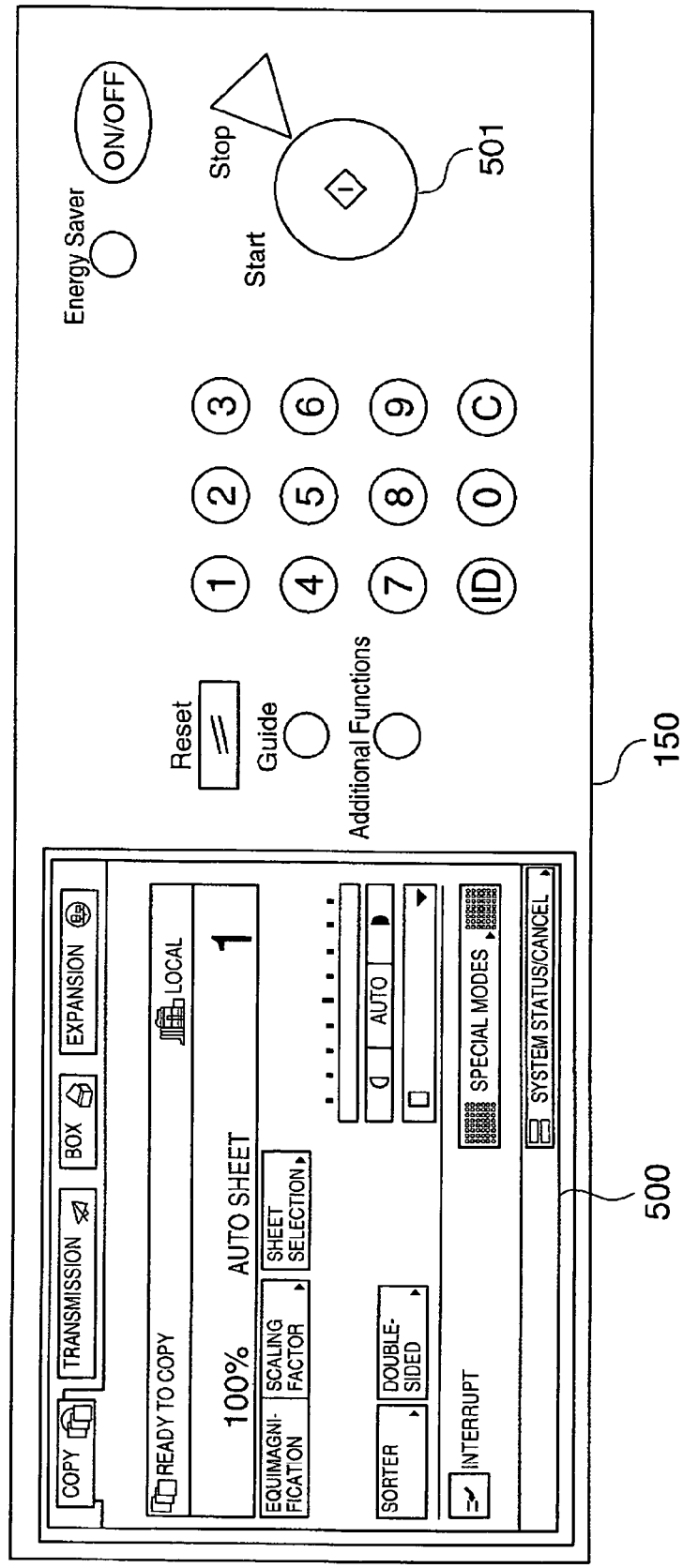
FIG. 10 is a view showing the appearance of an operating unit appearing in FIG. 1.
Figure 11:
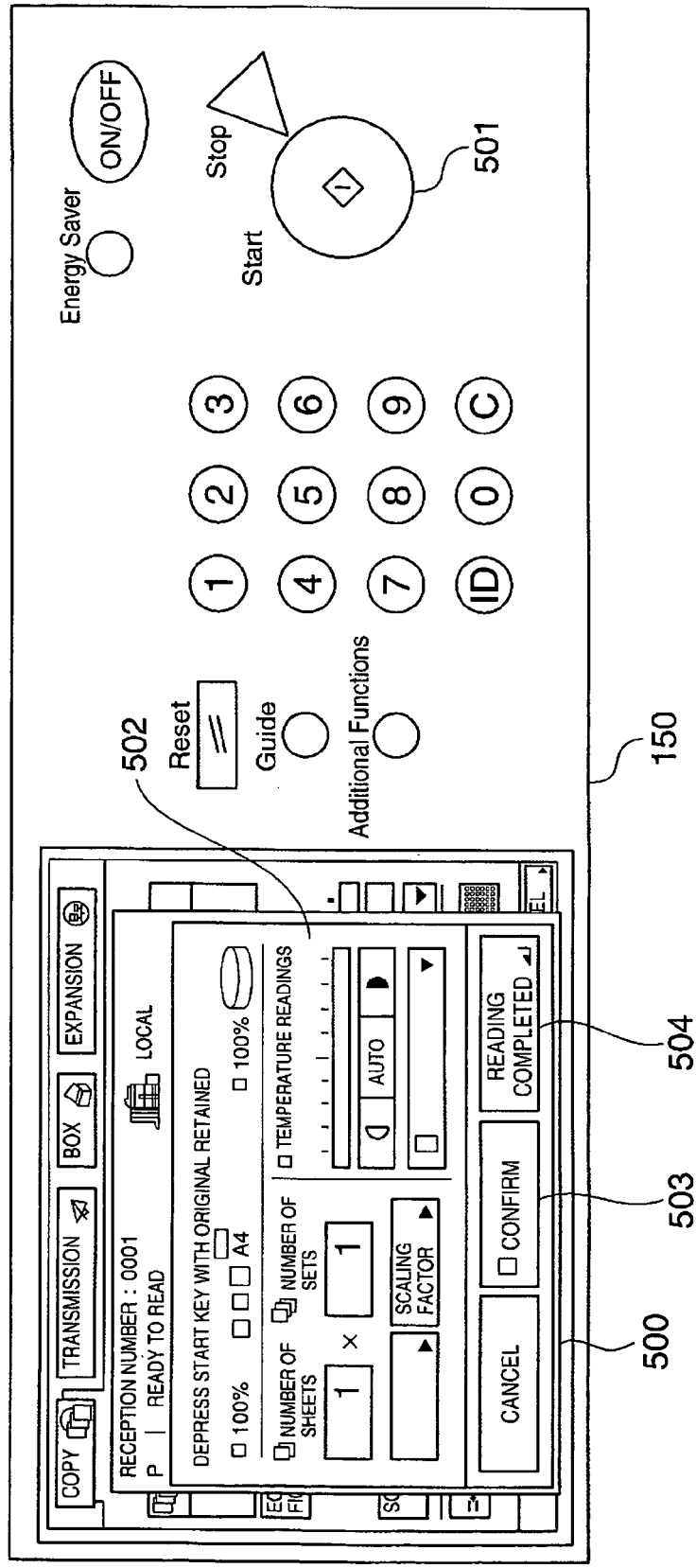
FIG. 11 is a view showing an example of an original reading setup screen displayed on the operating unit.

Referring next to FIGS. 10 to 12, a description will be given of the construction of the controller 150 appearing in FIG. 1. FIG. 10 is a diagram showing the appearance of the controller 150, FIG. 11 is a diagram showing an example of an original reading setup screen displayed on the operating unit 150, and FIG. 12 is a diagram showing an example of an original reading confirmation screen displayed on the operating unit 150.

As shown in FIG. 10, the operating unit 150 includes a liquid crystal display panel 500 with a touch panel that provides a user interface screen, and various hard keys including a start button 501. Via the user interface screen provided by the liquid crystal display panel 500, a user can set various copying modes (e.g., double-sided copying setting, grouping, sorting, and stapling). It should be noted that the copying modes may be set using either soft keys displayed on the touch panel or hard keys.

When the start button 501 is depressed, a copying process is started. If a "sequential reading mode" in which reading of originals and storage of read images are repeatedly carried out is selected as a copying mode, an original reading setup screen 502 in FIG. 11 is displayed on the liquid crystal display panel 500. On the original reading setup screen 502, there are displayed a "confirm" button 503 for entering into a mode in which images that have been read up to the present are displayed, and a "reading completed" button 504 for collectively outputting all the images that have been read up to the present are displayed.

Figure 13A:
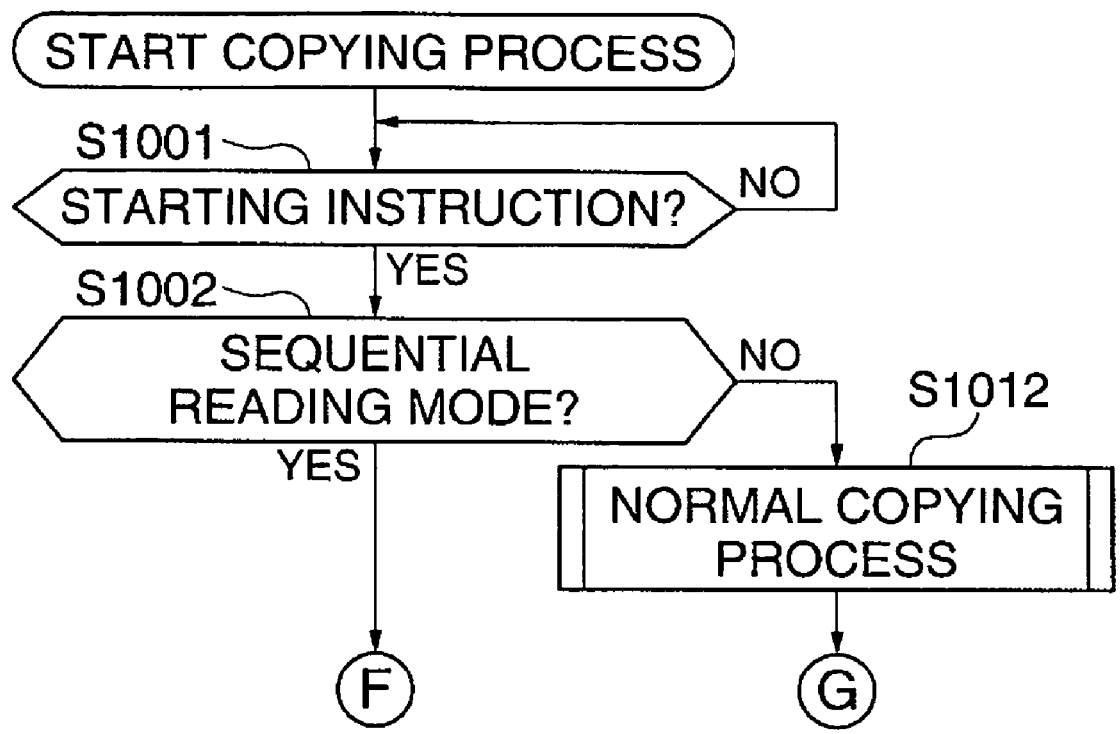
Figure 13B:
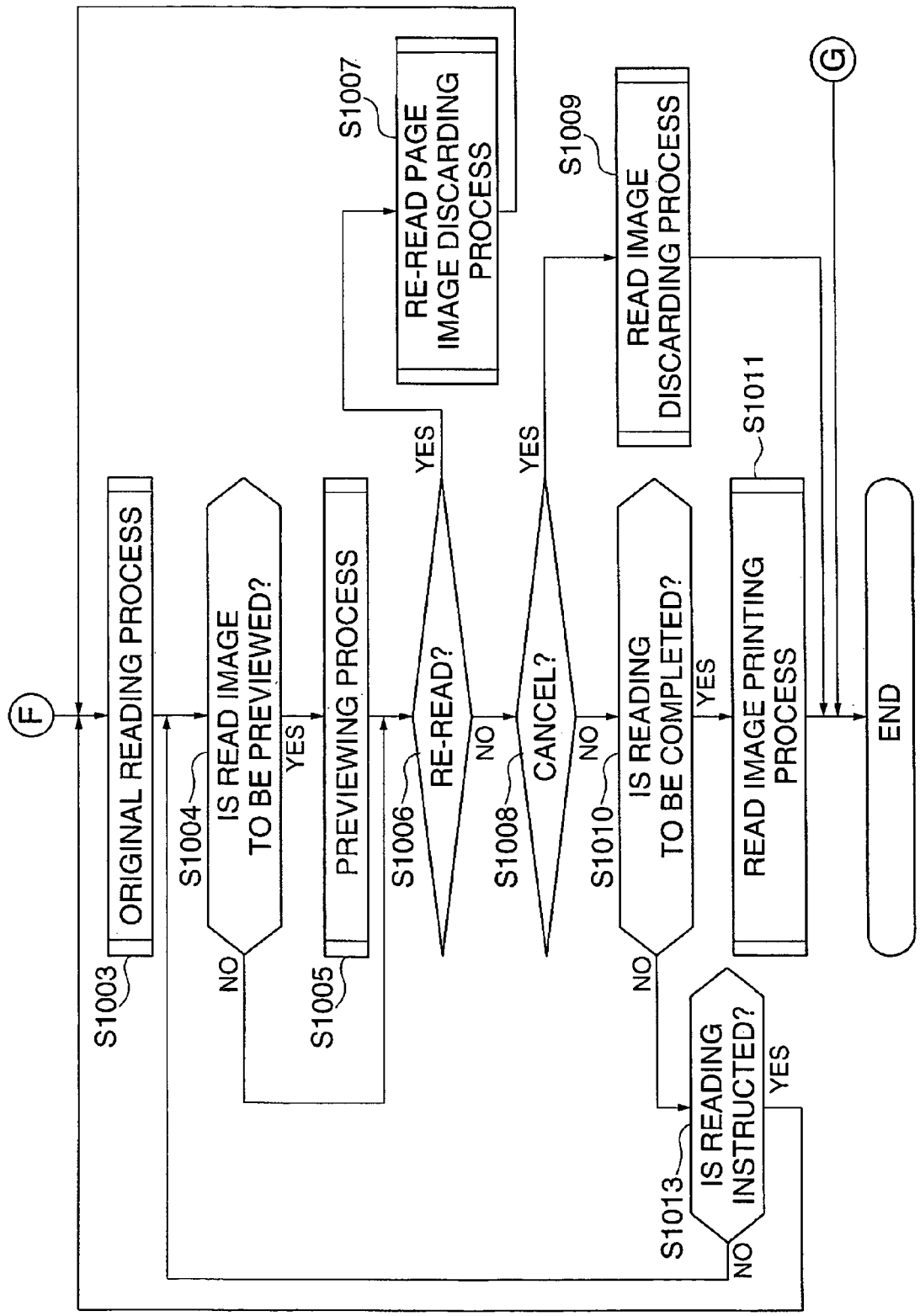

When the "confirm" button 503 is depressed on the original reading setup screen 502, an original reading confirmation screen 513 in FIG. 13B is displayed on the liquid crystal display panel 500. On the original reading confirmation screen 513 are displayed a display field 505 where the total number of pages of images that have been stored up to the present and the page number of the page being currently displayed, page shift buttons 506 and 507 for shifting the page of image stored, a zoom out button 508 and a zoom in button 509 for zooming out and in a preview image, a stored image confirmation screen 510 on which the contents of the page being displayed in the display field 505 are displayed, a "re-read" button 511 for closing the original reading confirmation screen 513, and a "close" button 512 for closing the original reading confirmation screen 513.

When the page shift button 506 is depressed, the page being currently displayed is switched to a previous page, and when the page shift button 507 is depressed, the page being currently displayed is switched to a next page. When the zoom out button 508 is depressed, the preview image is zoomed out, and the zoom in button 509 is depressed, the preview image is zoomed in. When the "re-read" button 511 is depressed, the page being currently displayed is stored, and the original reading confirmation screen 513 is closed.

When the original reading confirmation screen 513 is closed, the original reading setup screen 502 appears again, making it possible to read an original. In this case, reading is performed in the re-read mode. Similarly, when the original reading confirmation screen 513 is closed by depressing the "close" button 512, the original reading setup screen 502 appears again, making it possible to read an image. In this case, however, reading of an original is performed in the sequential reading mode.

In the sequential reading mode mentioned above, if one or more original images are stored, the obtained image data is stored at a location after the end of the existing image data. After all the original pages have been read, all the image data is dealt with as a single set of image data. On the other hand, in the re-read mode, particular image data of stored image data is replaced with newly read image data. In either mode, an instruction for reading an original is issued by depressing the start button 501.

Referring next to FIGS. 13A and 13B, a description will be given of a sequential reading copying process. FIGS. 13A and 13B are flow charts showing the procedure of the sequential-reading/copying process. The procedure in the flow chart of FIGS. 13A and 13B is carried out under the control of the controller 110 (the CPU 112).

As shown in FIG. 13A, first, in a step S1001, the controller 110 determines whether or not a starting instruction has been issued by depressing the start button 501. If a starting instruction has been issued by depressing the start button 501, it is determined in a step S1002 whether or not the "sequential reading mode" is set. If the "sequential reading mode" is not set, the controller 110 performs copying in the normal mode in a step S1012 and terminates the process. On the other hand, if the "sequential reading mode" is set, an original reading process for reading a set of originals in the original feeding unit 250 or an original placed on the platen glass 211 is carried out in a step S1003. When the original reading process is completed, it becomes possible to give an instruction through the operating unit 150.

Next, in a step S1004, the controller 110 determines whether or not an instruction for carrying out a previewing process in which images stored in the image storage unit 160 are displayed has been issued. If the instruction for carrying out the previewing process has been given, the process proceeds to a step S1005 wherein the controller 110 carries out the previewing process. The process then proceeds to a step S1006. On the other hand, if the instruction for carrying out the previewing process has not been issued, the process proceeds to the step S1006 with the step S1005 being skipped.

In the step S1006, the controller 110 determines whether or not a re-reading instruction has been issued. Here, the re-reading instruction is issued during the previewing process in the step S1005, and if the re-reading instruction is issued, data indicative of the storage location of a page image to be re-read is stored. If the re-reading instruction has been issued, the process proceeds to a step S1007 wherein the controller 110 carries out a process in which the image data of the page stored when re-reading was instructed is discarded (deleted). The process then returns to the step S1003 wherein the controller 110 carries out the original reading process to replace the image data of the page to be re-read with newly read image data. In the original reading process, it is possible to read all the originals set on the original feeding unit 250, to read an original placed on the platen glass 211, and to read a number of originals among originals set on the original feeding unit 250. In the re-reading, the number of originals to be read is set to 1.

If it is determined in the step S1006 that the re-reading instruction has not been issued, the process proceeds to a step S1008 wherein the controller 110 determines whether or not an instruction for canceling reading in the sequential reading mode has been issued. If the canceling instruction has been issued, the process proceeds to a step S1009 wherein the controller 110 discards all the image data that has been read and stored up to the present, followed by termination of the process.

If it is determined in the step S1008 that the canceling instruction has not been issued, the process proceeds to a step S1010 wherein the controller 110 determines whether or not an instruction for terminating reading has been issued. If the instruction for terminating reading has been issued, the process proceeds to a step S1011 wherein the controller 110 carries out a read image printing process in which all the image data that has been read up to the present is printed, followed by termination of the process.

If it is determined in the step S1010 that the instruction for terminating reading has not been issued, the process proceeds to a step S1013 wherein the controller 110 determines whether or not a reading instruction has been issued. If the reading instruction has been issued, the process returns to the step S1003 wherein the controller 110 carries out the original reading process. On the other hand, if the reading instruction has not been given, the process returns to the step S1004. Thus, if no instruction is input via the operating unit 150, the controller 110 waits until the image confirming instruction, the re-reading instruction, the reading canceling instruction, the reading terminating instruction, or the reading instruction is issued.

Figure 14:
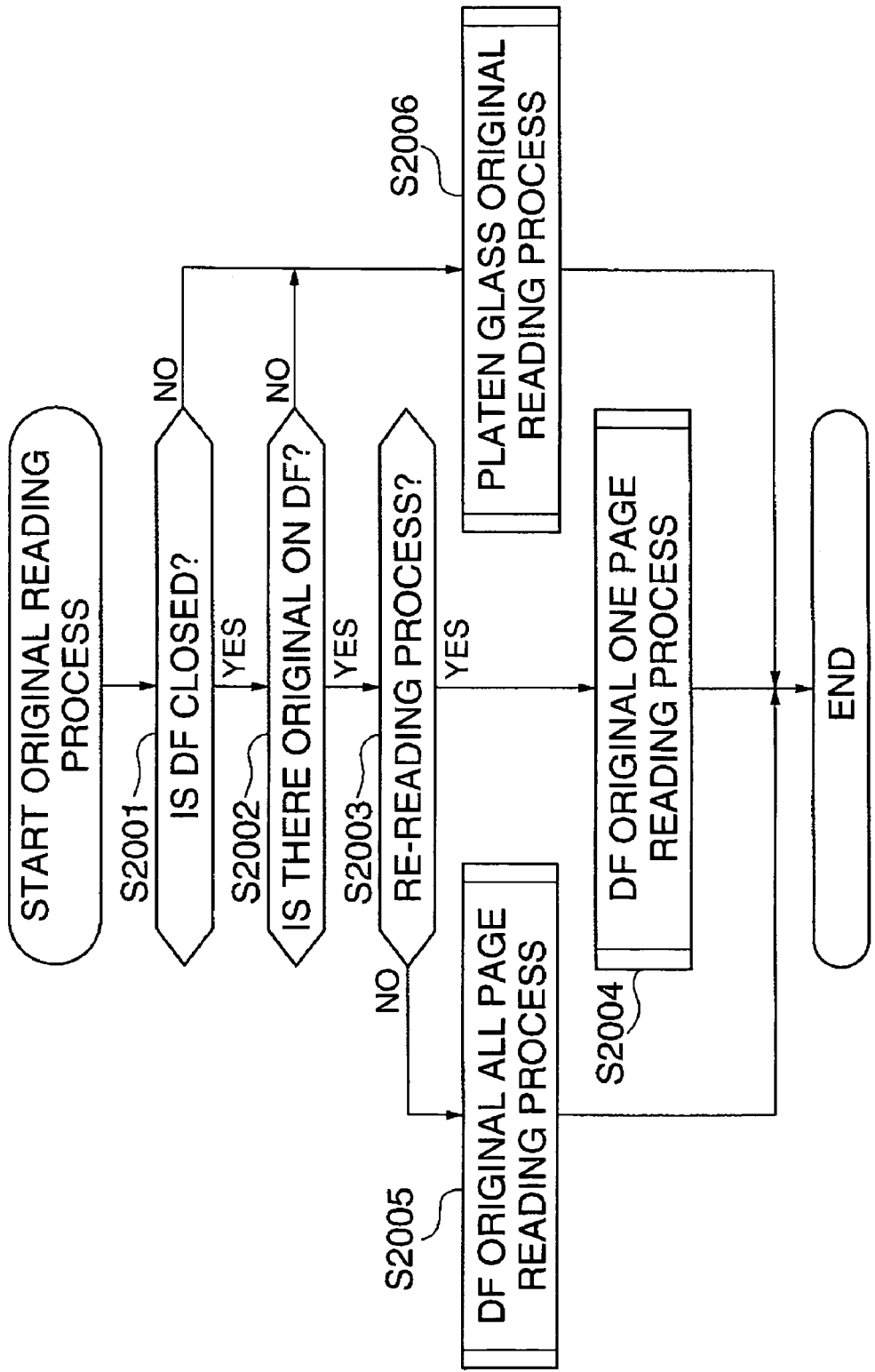
FIG. 14 is a flow chart showing the procedure of an original reading process in a step S1003 in FIG. 13B.

Referring next to FIG. 14, a detailed description will be given of the original reading process in the step S1003 in FIG. 10. FIG. 14 is a flow chart showing the procedure of the original reading process in the step S1003.

As shown in FIG. 14, in the original reading process, first, the controller 110 determines in a step S2001 whether or not the original feeding unit (DF) 250 is closed relative to a main body of the apparatus. If the original feeding unit (DF) 250 is not closed, i.e. opened, the process proceeds to a step S2006 wherein the controller 110 carries out a process for reading originals placed on the platen glass 211 in a step S2006, followed by termination of the process.

If it is determined in the step S2001 that the original feeding unit (DF) 250 is opened, the controller 110 determines in a step S2002 whether or not a set of originals is placed on the original feeding unit (DF) 250. If a set of originals is not placed on the original feeding unit (DF) 250, the process proceeds to the step S2006 wherein the controller 110 carries out the process for reading an original placed on the platen glass 211, followed by termination of the process.

If it is determined in the step S2002 that a set of originals is placed on the original feeding unit (DF) 250, the controller 110 determines in a step S2003 whether or not the re-reading instruction has been issued. If the re-reading instruction has been issued, the process proceeds to a step S2004 wherein the controller 110 carries out a process for feeding only one original in the set of originals placed on the original feeding unit (DF) 250 and reading the fed original, followed by termination of the process.

If it is determined in the step S2003 that the re-reading instruction has not been issued, the process proceeds to a step S2005 wherein the controller 110 carries out a process for reading all the pages of the original set placed on the original feeding unit (DF) 250, followed by termination of the process.

Figure 15A:
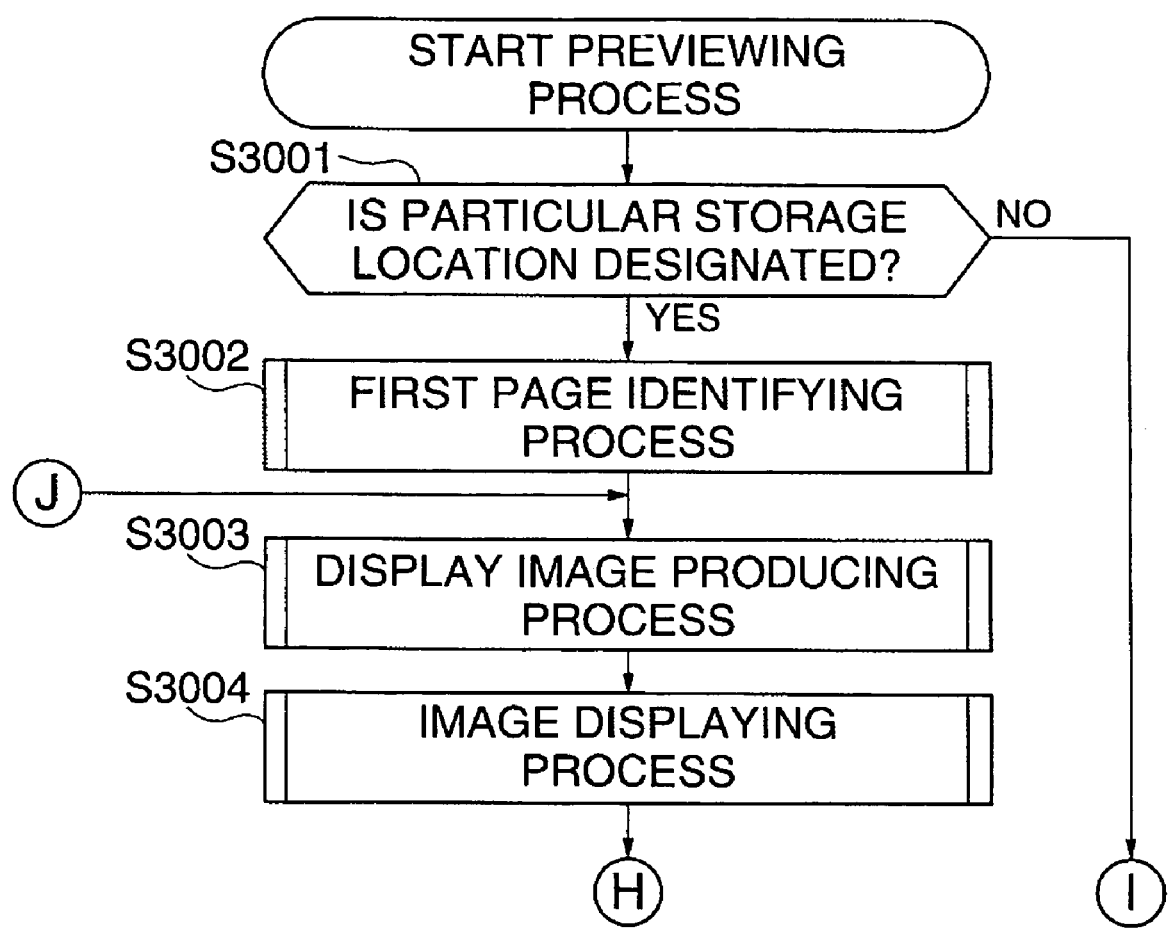
Figure 15B:
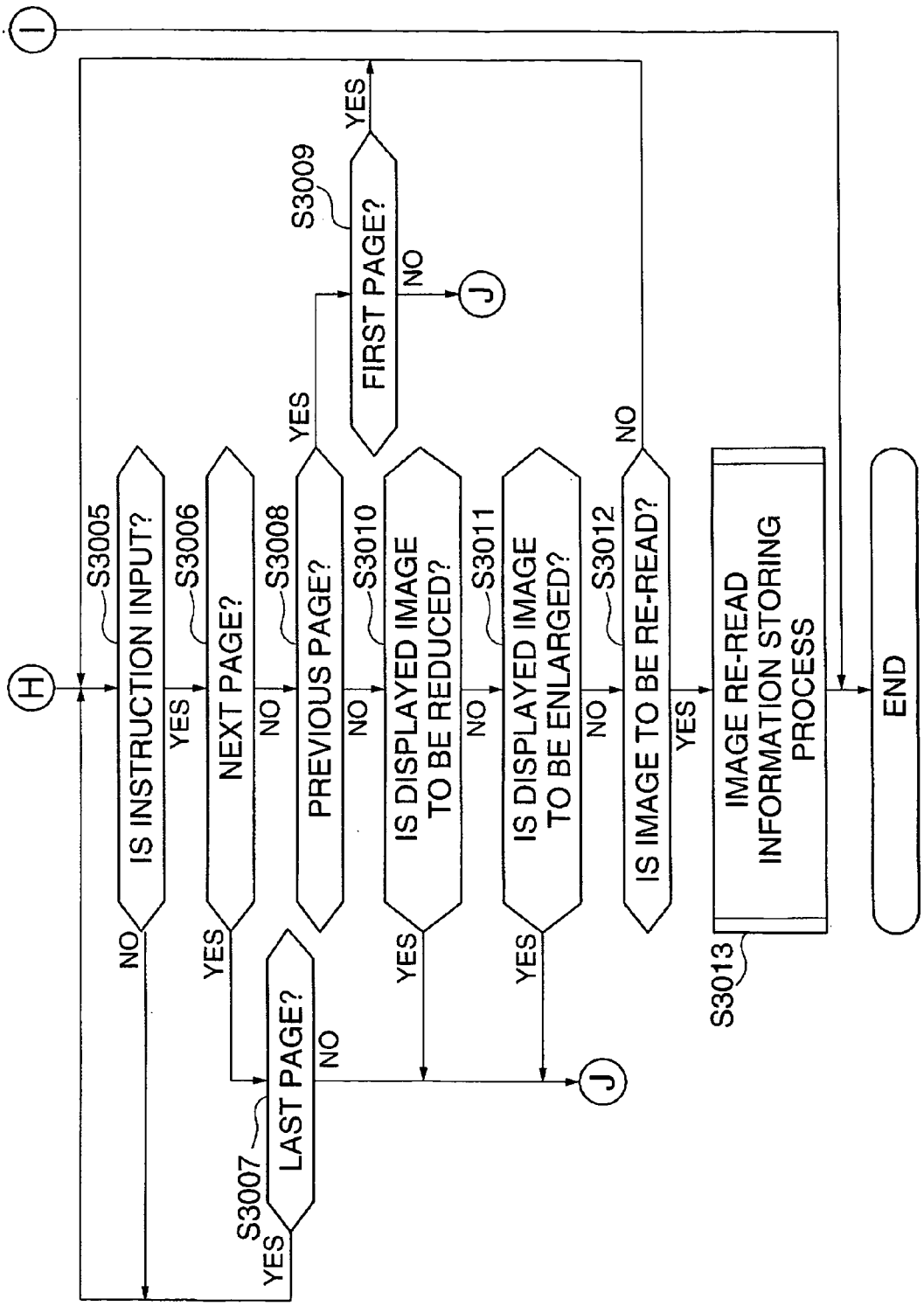

Referring next to FIGS. 15A and 15B, a detailed description will be given of the previewing process in the step S1005. FIGS. 15A and 15B are flow charts showing the procedure of the previewing process in the step S1005 in FIG. 13B.

As shown in FIG. 15A, in the previewing process, first, the controller 110 determines in a step S3001 whether or not a particular storage location to which image to be confirmed is stored is designated. The image data repeatedly read in the sequential reading mode is managed under the job manager 902 of the document manager 900, the copy processing being executed uses the job manager 902 as image storage location. Under such management, therefore, by designating the job manager 902 as a location where image data is to be stored, it is possible to read image data read and stored until that time from the first to last pages. On the other hand, if it is determined in the step S3001 that no storage location is designated, the controller 110 terminates the process without executing any preview process.

If it is determined in step S3001 that a storage location is designated, the process proceeds to a step S3002. In the step S3002, the first page of the stored image data is identified by the controller 110. In the next step S3003, the controller 110 produces preview image data to be displayed on the stored image confirmation screen 510 (FIG. 12) from the stored image data of the first page. Although in the present embodiment, the preview image data is produced immediately before it is displayed on the stored image confirmation screen 510, the preview image data to be displayed on the stored image confirmation screen 510 may be produced when original image data is read and stored, and the produced preview image data may be stored in association with the original image data in the image storage unit 160. In the step S3004, the controller 110 displays the preview image data produced in step S3003 on the stored image confirmation screen 510.

The controller 110 then waits in a step S3005 until an instruction is input. If any instruction is input, the process proceeds to a step S3006 wherein the controller 110 determines whether or not the input instruction is an instruction for displaying the next page. If it is determined that the input instruction is the instruction for displaying the next page, the process proceeds to a step S3007 wherein the controller 110 determines whether or not the current page is the last page. If it is determined that the current page is the last page, the process returns to the step S3005. On the other hand, if it is determined that the current page is not the last page, the process returns to the step S3003.

If it is determined in the step S3006 that the input instruction is not the instruction for displaying the next page, the process proceeds to a step S3008 wherein the controller 110 determines whether or not the input instruction is an instruction for displaying the previous page. If it is determined that the input instruction is the instruction for displaying the previous page, the process proceeds to a step S3009 wherein the controller 110 determines whether or not the current page is the first page. If it is determined that the current page is the first page, the process returns to the step S3005. On the other hand, if it is determined that the current page is not the first page, the process returns to step S3003.

If it is determined in the step S3008 that the input instruction is not the instruction for displaying the previous page, the process proceeds to a step S3010 wherein the controller 110 determines whether the input instruction is an instruction for zooming out the image displayed in the stored image confirmation screen 510. If so, the process returns to the step S3003 wherein the controller 110 produces scaled-down image data of the specified page, which is to be displayed on the stored image confirmation screen 510, and the controller 110 carries out the subsequent steps again.

If it is determined in the step S3010 that the input instruction is not the zoom-out instruction, the process proceeds to a step S3011. In the step S3011, it is determined whether or not the input instruction is a zoom-in instruction. If it is determined that the input instruction is the zoom-in instruction, the process returns to the step S3003 wherein the controller 110 produces scaled-up image data of the specified page, which is to be displayed on the stored image confirmation screen 510, and the controller 110 carries out the subsequent steps again.

If it is determined in the step S3011 that the input instruction is not the zoom-in instruction, the process proceeds to a step S3012 wherein the controller 110 determines whether or not the input instruction is a re-read instruction. If it is determined that the input instruction is not the re-read instruction, the process returns to the step S3005 wherein the controller 110 waits until an instruction is input. If it is determined that the input instruction is the re-read instruction, the process proceeds to a step S3013 wherein the controller 110 determines which location in the document manager 900 the image data corresponding to the currently displayed page is stored at, and stores identification information indicative of the location and the like. Thereafter, the controller 110 terminates the process. The identification information stored in the step S3013 is transferred to the image reading process described above, and re-reading is performed in accordance with the identification information.

Figure 16:
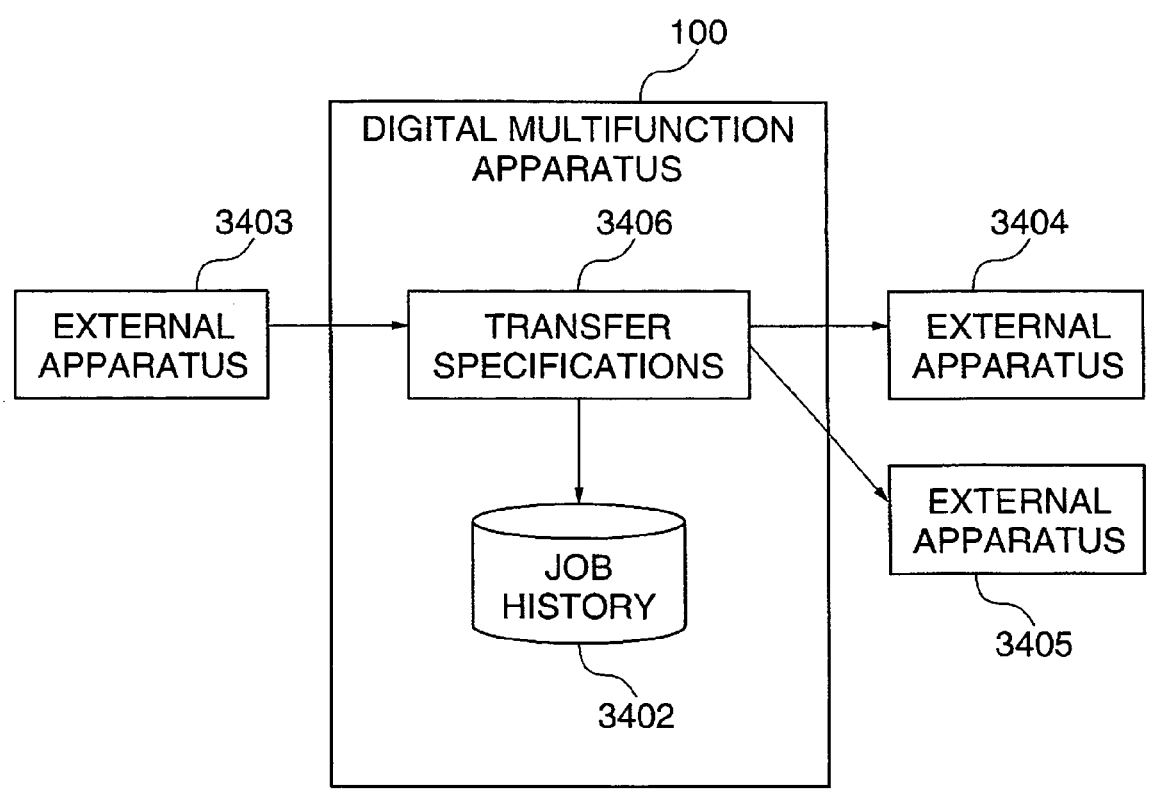
FIG. 16 is a diagram schematically showing a transfer function of the digital multifunction apparatus in FIG. 1.

The digital multifunction apparatus 100 according to the present embodiment has a transfer function. A description will now be given of the transfer function with reference to FIG. 16. FIG. 16 is a diagram schematically showing the transfer function of the digital multifunction apparatus 100 in FIG. 1.

Upon receiving a job (image data) from an external apparatus (an apparatus that is located on the LAN 600 or an apparatus that is not located on the LAN 600), the digital multifunction apparatus 100 determines whether or not it is necessary to transfer the received job (image data) in accordance with set transfer specifications 3406. If it is necessary to transfer the received job (image data), the digital multifunction apparatus 100 transmits the job to at least one corresponding destination such as external apparatuses 3404 and 3405 (apparatuses that are not located on the LAN 600). This function of transferring a job (image data) received from an external apparatus to other external apparatuses is referred to as a transfer function. When a job is transferred, the job transfer result is stored as job history information 3402 in the image storage unit 160. In this way, a transfer pattern in which a job (image data) is transferred from one apparatus to a plurality of apparatuses can be realized.

In general, facsimile communication is carried out via a public line, and hence a communication fee is high. On the other hand, there is an internet facsimile function using an electronic mail system (hereinafter referred to as an I-FAX function). By using this function, it is possible to considerably reduce the communication fee. With a system configure to carry out transfer using the I-FAX function, transfer can be carried out with a very low communication fee, even if a transfer destination is far away, for example.

In the digital multifunction apparatus 100 having the transfer function described above, if job history information related to transferred jobs is stored as detailed as possible, it is possible to manage transferred jobs effectively. For example, if an environment in which image data is transferred via the digital multifunction apparatus 100 is constructed, and a means for recording image data related to all the transfer jobs in the storage device is used, it is possible to manage transferred image data.

Image data, however, is large in capacity, and therefore a storage unit with a very large storage capacity must be used to record image data dealt with by all the transfer jobs.

To cope with this, in the present embodiment, in transferring image data comprised of a bitmap, a character extracting process is carried out in which the image data comprised of the bitmap is converted into text data, and the text data is stored in association with job history information, making it possible to manage image data dealt with by transfer jobs without using a large-capacity storage unit. If there is some room in the storage unit, however, image data may be stored as it is. Also, image data except for information obtained by character extraction may be stored in the form of scaled-down image data and compressed image data.

Figure 17:
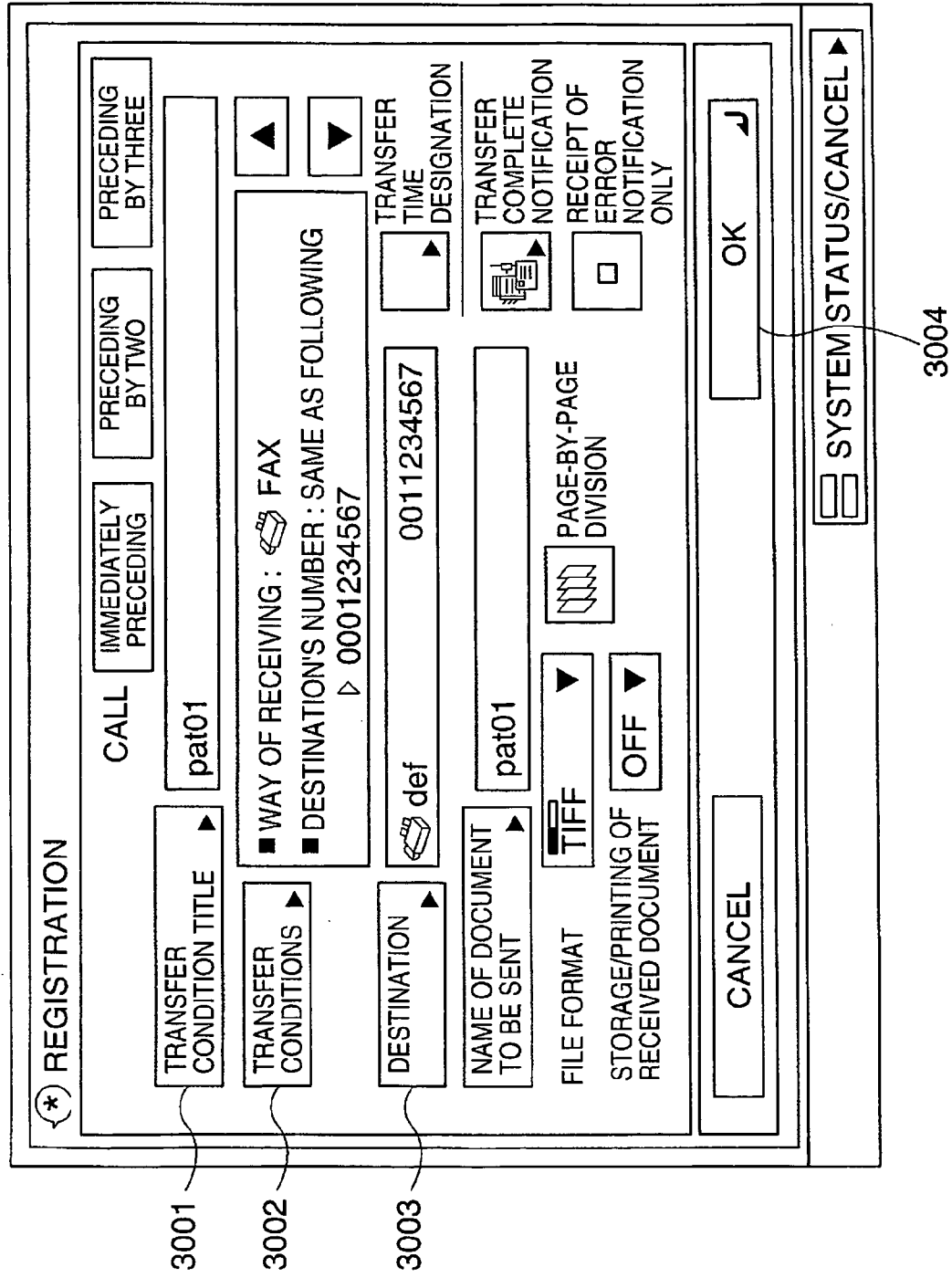
FIG. 17 is a view showing an example of the layout of a screen for setting transfer specifications of the digital multifunction apparatus in FIG. 1.
Figure 18:
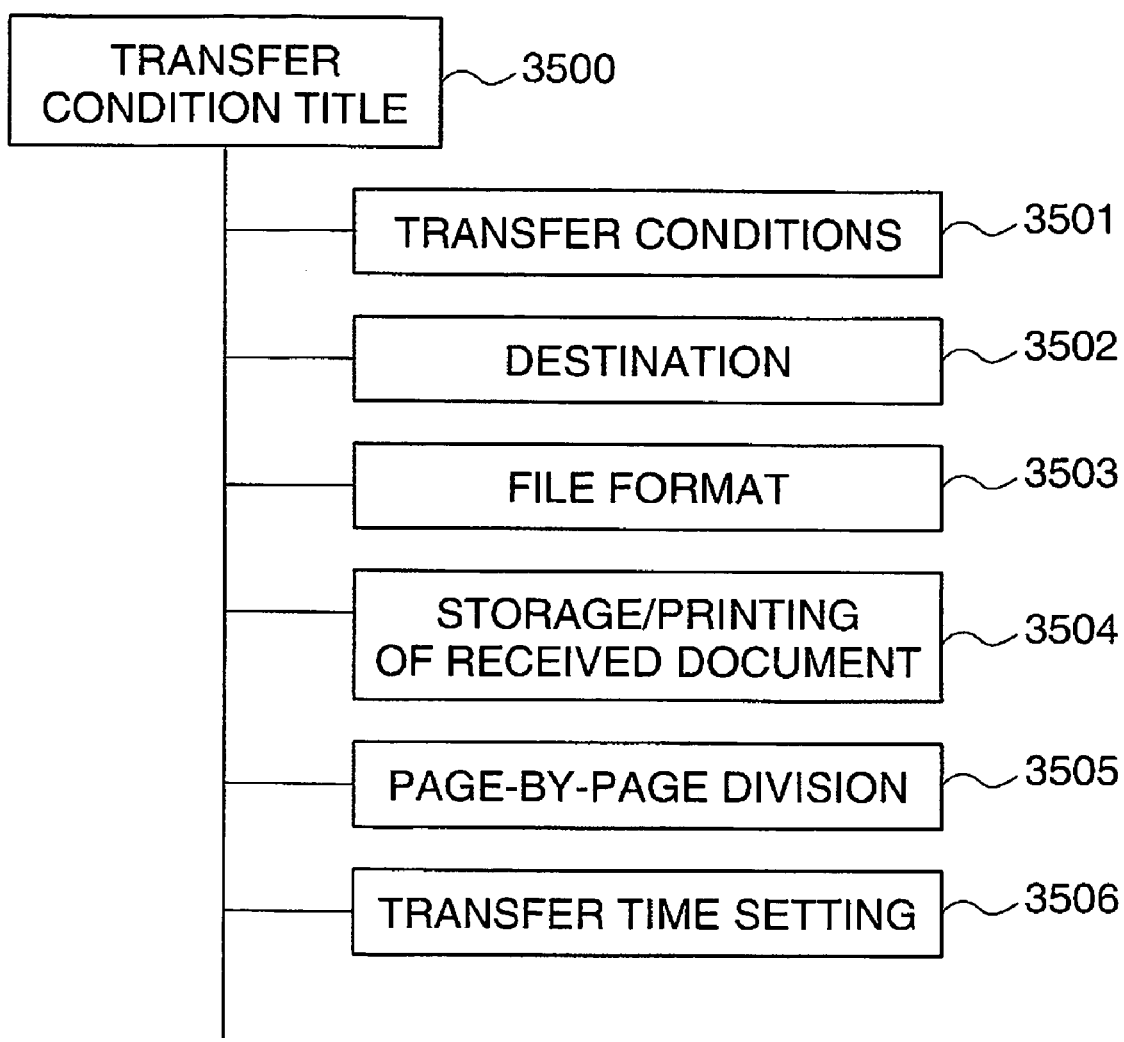
FIG. 18 is a diagram showing an example of a structure for storing the transfer specifications that have been set.

Referring next to FIGS. 17 and 18, a description will be given of how to set the transfer specifications 3406.

FIG. 17 is a view showing an example of the layout of a screen for setting transfer specifications in the digital multifunction apparatus 100 in FIG. 1, and FIG. 18 is a diagram showing an example of a structure for storing the set transfer specifications.

To set the transfer specifications 3406, the screen in FIG. 17, for example, is displayed on the operating unit 150 (the liquid crystal display panel 500). On this screen there are displayed a button 3001 for inputting a transfer condition title, a button 3002 for inputting transfer conditions, a button 3003 for inputting a destination, and an OK button 3004 for confirming the transfer condition title, the transfer conditions, and the destination, which are input by operating the buttons 3001, 3002, and 3003, respectively.

The transfer condition title is a title given to transfer conditions being currently input. The transfer conditions may be in various forms. For example, in the case where the screen in FIG. 17 is displayed, the transfer conditions are such that an image (job) received by facsimile is transferred to a set destination (="0011234567") in the case where a telephone number of the sender of the facsimile corresponds to a set number (="0011234567"). In this example, if the button 3003 is depressed, a list of addresses in an address book, not shown, is displayed, and a destination or a group of destinations is selected from the address book.

When the OK button 3004 is depressed after a transfer condition title, transfer conditions, a destination, and so forth are input on the screen, the input transfer condition title, transfer conditions, destinations, and so forth are stored as a set of transfer specifications in a predetermined area of the image storage unit 160. For example, as shown in FIG. 18, transfer conditions 3501, a destination 3502, a file format 3503, received document storage/printing 3504, page-by-page division 3505, a transfer time setting 3506, and so forth are stored as a set of transfer specifications.

Figure 19:
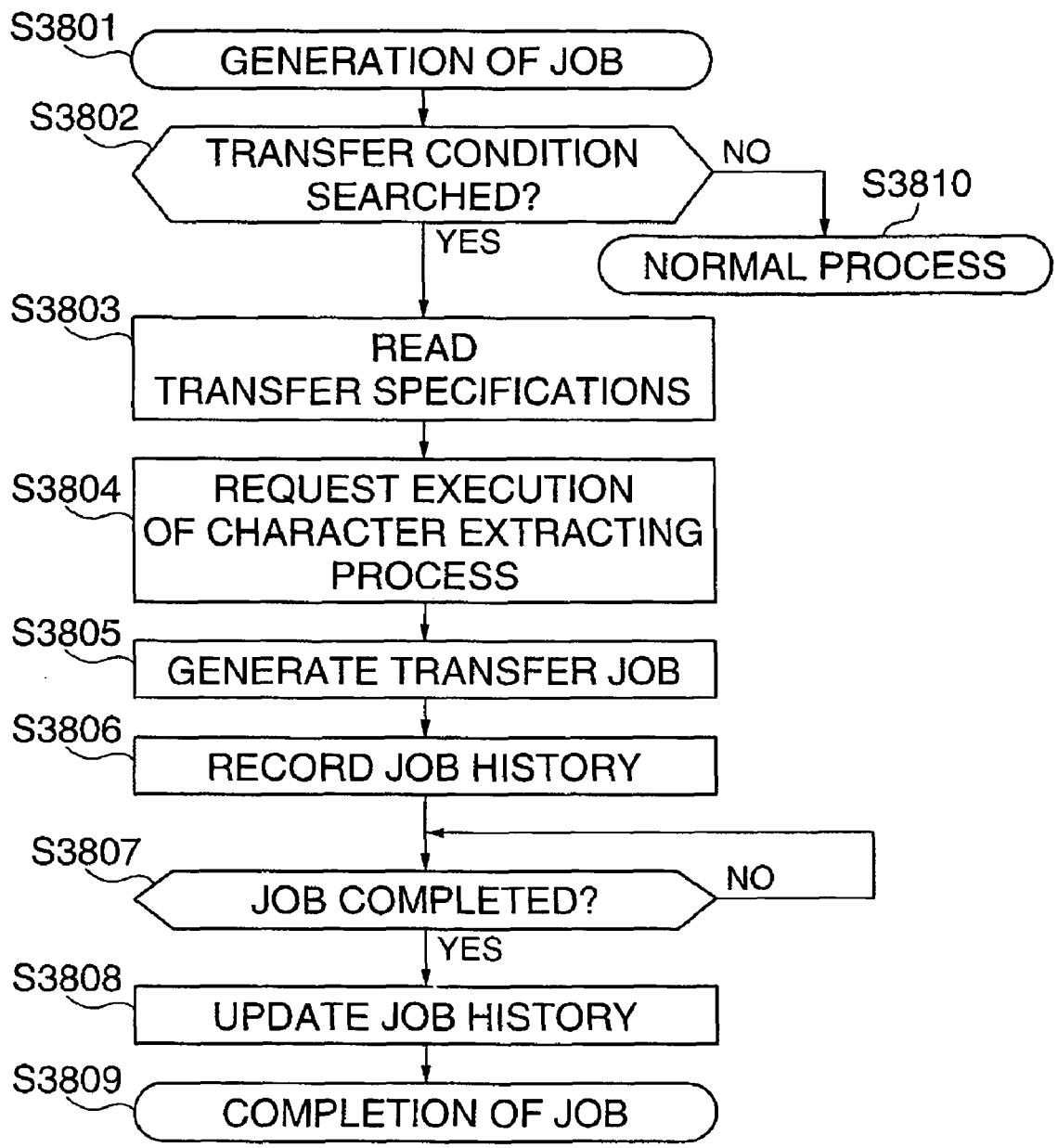
FIG. 19 is a flow chart showing the procedure of performing in which a transfer job in the digital multifunction apparatus in FIG. 1.
Figure 20:
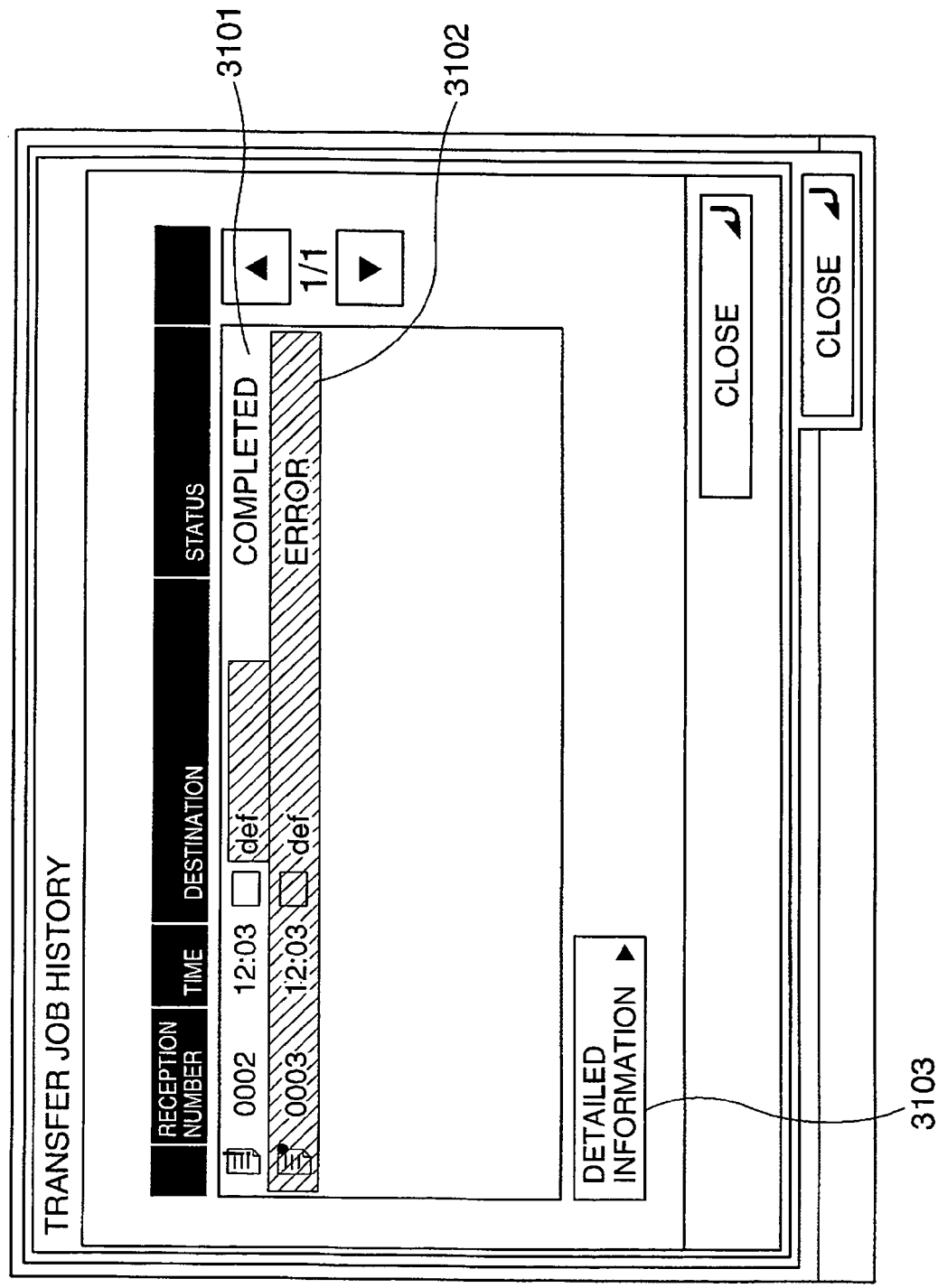
FIG. 20 is a view showing an example of a list display screen on which job history information is displayed.
Figure 22:
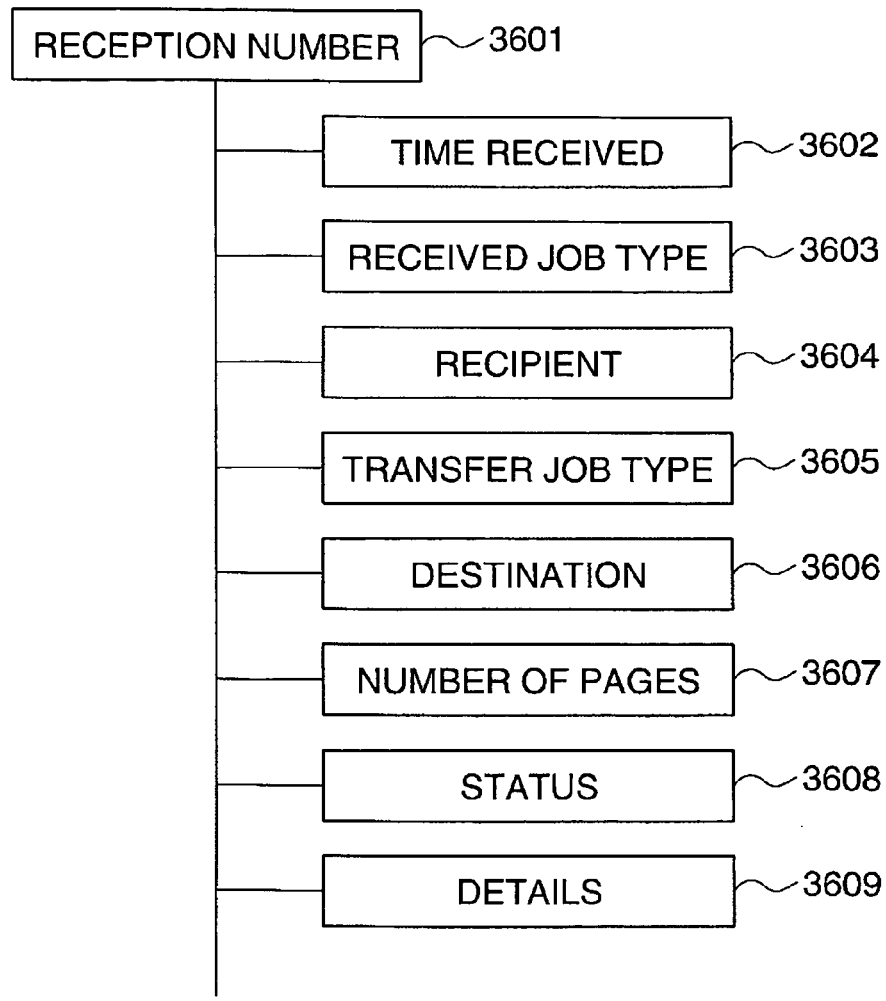
FIG. 22 is a diagram showing an example of items constituting job history information.
Figure 23:
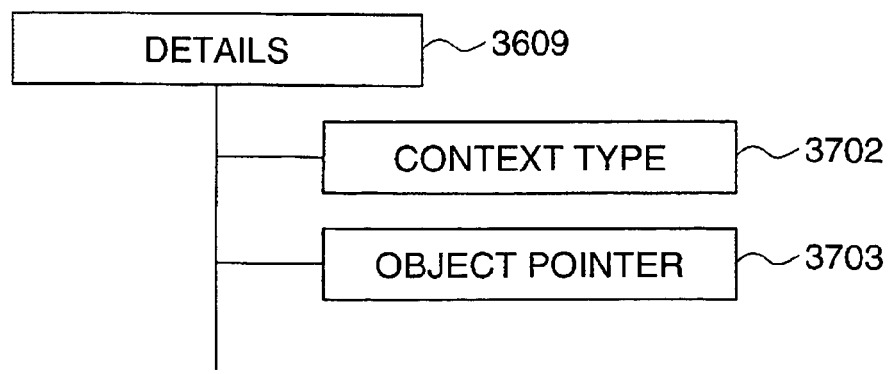
FIG. 23 is a diagram showing items included in items constituting job history information.
Figure 24:
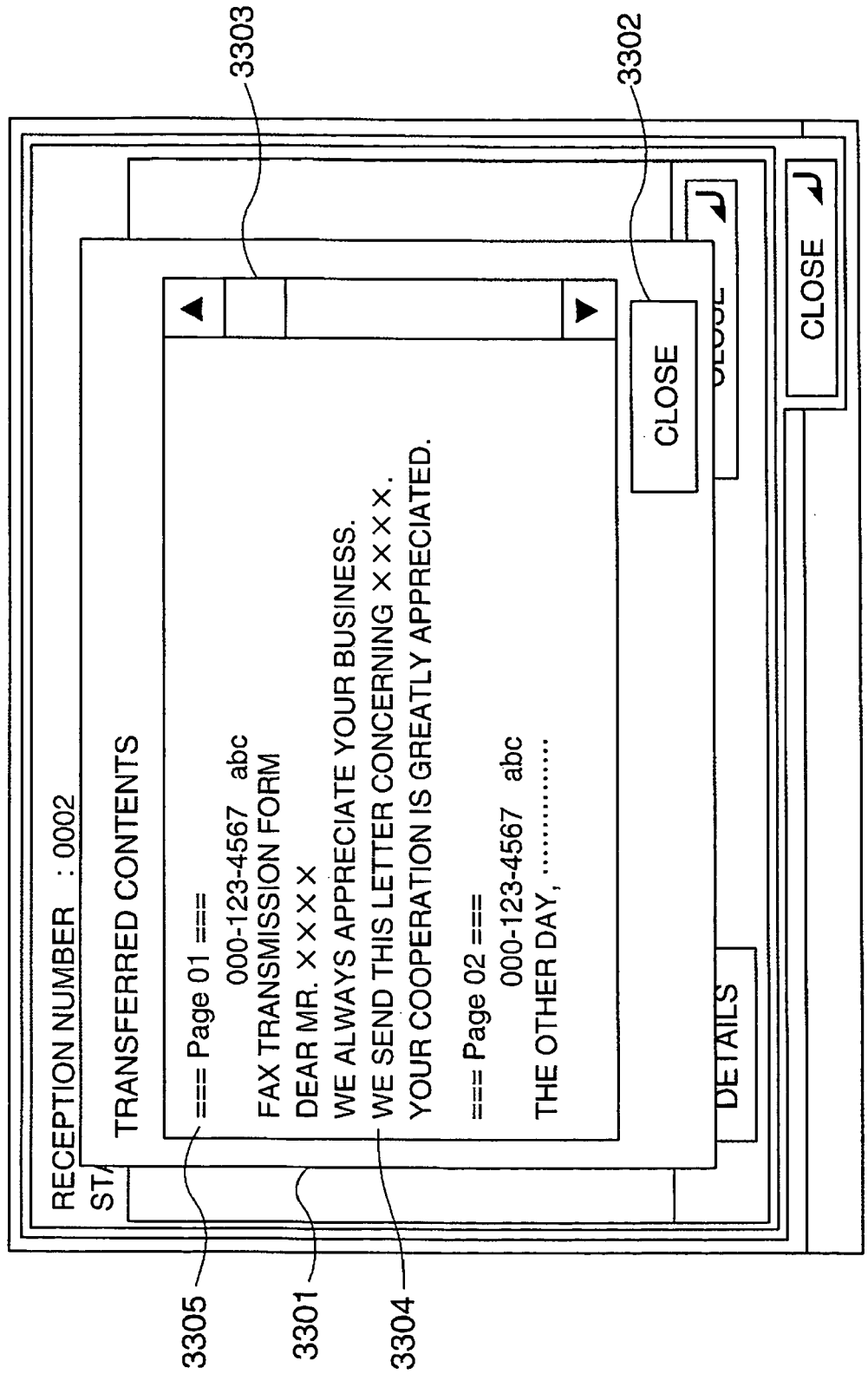
FIG. 24 is a view showing an example of a display screen on which a character extraction result associated with job history information is displayed.

A description will now be given of how a transfer job is performed with reference to FIGS. 19 to 24. FIG. 19 is a flow chart showing the procedure of a process in which a transfer job is performed in the digital multifunction apparatus 100 in FIG. 1, FIG. 20 is a view showing an example of a list display screen on which job history information is displayed, FIG. 21 is a view showing in detail job history information selected on the screen in FIG. 20, FIG. 22 is a diagram showing an example of items constituting job history information, FIG. 23 is a diagram showing items included in items constituting job history information, and FIG. 24 is a view showing an example of a display screen on which a character extraction result associated with job history information is displayed. The procedure in the flow chart of FIG. 19 is carried out under the control of the controller 110 (the CPU 112).

As shown in FIG. 19, when a job is generated (step S3801), the process proceeds to a step S3802 wherein the controller 110 searches all the sets of the stored transfer specifications and determines whether or not the generated job satisfies the transfer conditions in any set of the transfer specifications. If the job that has occurred does not match any transfer conditions in the transfer specifications, the controller 110 shifts the process to a normal process in a step S3810 so that the job is performed in the normal process.

If it is determined in the step S3802 that the generated job satisfies the transfer conditions in a corresponding set of the transfer specifications, the controller 110 reads the transfer specifications corresponding to the job in a step S3803, and then requests execution of a character extracting process in a step S3804. The character extracting process will be described later in detail. In the next step S3805, the controller 110 generates a transfer job based on various information on the read transfer specifications such as a file format 3503, page-by-page division 3505, and a transfer time setting 3506 and requests the job manager 811 (see FIG. 6) to perform the transfer job. As a result, the job is transferred to a set destination at a set transfer time via the job manager 811.

In the next step S3806, the controller 110 stores job history information indicative of the execution result of the transfer job in the image storage unit 160. The job history information includes text information obtained via the character extracting function as described above. In perusing the job history information, the screen shown in FIG. 20, for example, is displayed as a user interface screen on the operating unit 150. A list of transfer jobs that have already been completed is displayed on the screen, and in this example, the screen indicates that a job 3101 with a reception number "0002" has been normally completed and an error has occurred in a job 3102 with a reception number "0003". If a button 3103 for displaying detailed information is depressed, the screen being currently displayed is switched to a screen that displays detailed information. For example, if the button 3013 is depressed in a state in which the job 3101 with the reception number "0002" is selected, the screen 3201 shown in FIG. 21, for example, is displayed. The screen 3201 displays in detail job history information on the job 3101 with the reception number "0002".

As shown in FIG. 22, the job history information includes items such as a reception number 3601 that is issued in the order in which jobs are received, a time received 3602, a received job type 3603, a recipient 3604, a transferred job type 3605, a destination 3606, the number of processed pages 3607, a job status 3608, and detailed information 3609. As shown in FIG. 23, the detailed information 3609 includes a context type 3702 for indicating that a character extraction result is a text file on a file system, and an object pointer 3703 indicative of the name of the text file as the character extraction result recorded on the file system. The context type 3702 and the object pointer 3703 serve as pointers for the text file (the file of the character extraction result) on the image storage unit 160. That is, the detailed information 3609 is intended to link job history information and a file of a character extraction result stored in the image storage unit 160 with each other. As a result, job history information and corresponding text data obtained by character extraction can be recorded in association with each other, and text data obtained by character extraction can be read out based on corresponding job information.

In this example, on the screen 3201 in FIG. 21, a reception number "0002", a time received "2001/05/15 12:03", a received job type "FAX", a recipient "RXNAME1", a transferred job type "FAX", a destination "def 001234567", the number of processed pages "19", and a job status "completed" are displayed as job history information on the job 3101 with the reception number "0002".

In perusing a character extraction result associated with job history information, a "details" button 3202 in the screen 3201 is depressed. When the "details" button 3202 is depressed, a screen 3301 for displaying text data 3304 that is a character extraction result is displayed as shown in FIG. 24. A "close" button 3302 for closing the screen 3301 and a scroll bar 3303 are provided on the screen 3301. A tag 3305 is inserted at a page separating position in the displayed text data 3304. The tag 3305 is automatically inserted during character extraction.

In the above-mentioned step S3806 in FIG. 19, the current status of the transfer job is "being received".

The controller 110 then waits for the transfer job to be completed in a step S3807. When the transfer job is completed, the controller 110 updates the status of the job history information to "completed" in a step S3808. The controller 110 then terminates the process in a step S3809. In the above described manner, the series of processes from the generation of a job, issuance of a transfer job for the generated job, and termination of the transfer job are carried out.

Figure 25:
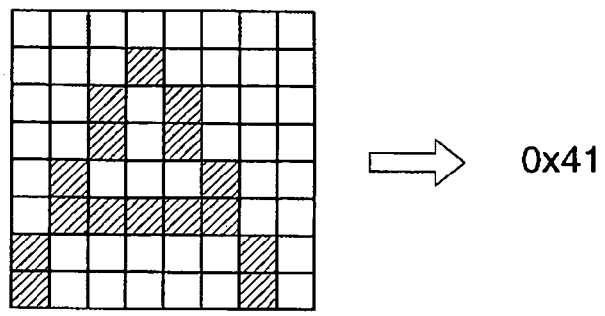
FIG. 25 is a view showing an example of image data to be processed by character extraction.
Figure 26:
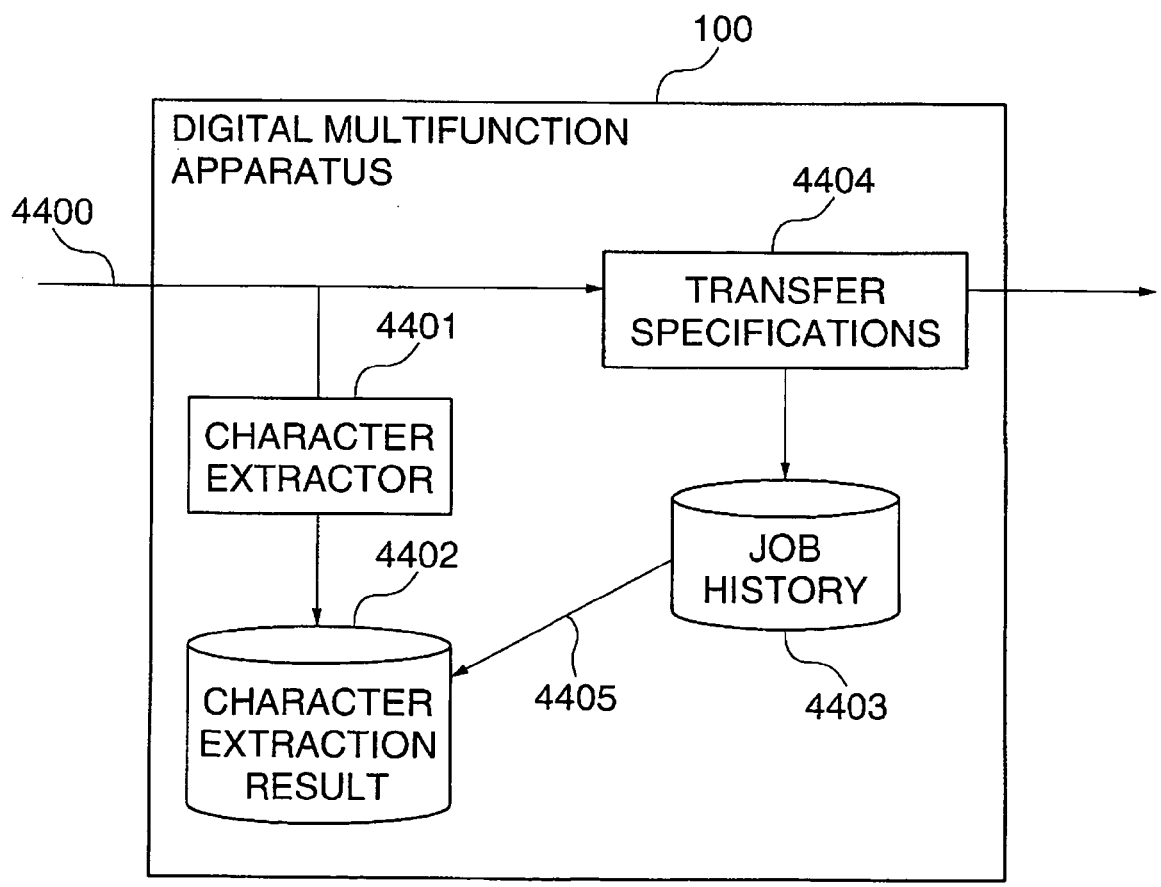
FIG. 26 is a view schematically showing an example of a manner in which a character extraction result is associated with job history information.

Referring next to FIGS. 25 and 26, a detailed description will be given of a process in which text data is generated from image data of a job by the character extracting process and then recorded. FIG. 25 is a view showing an example of image data processed by character extraction, and FIG. 26 is a view schematically showing a manner in which a character extraction result is associated with job history information.

In the character extracting process, bitmap image data is collated with patterns stored in advance to thereby identify a character corresponding to the image data and obtain a character code of the identified character. The bitmap image data is, for example, image data obtained by reading an original. For example, if a character "A" is comprised of an 8×8 bitmap and one bit is expressed as a binary code, a storage capacity of 8 bytes is required. If character extraction is performed on the bitmap, the character "A" expressed by the bitmap is converted into a 1-byte code "0x41" that is an ASCII code. In this example, a storage capacity that is eight times as large as a storage capacity for a character code is required. Thus, in the case where characters in an A4 document are stored as bitmap information, a storage capacity that is thousand times as large as a storage capacity required for storing the characters in the form of character codes is usually required.

In an ordinary computer, when the character code "0x41" is read out, the character "A" is displayed. Although it is a matter of course that the bitmap resolution of the character "A" varies depending on systems, no problem arises because the character code "0x41" represents the character "A". That is, the character "A" can be defined by the character code "0x41", and hence it can be said that such general versatility of character codes is an advantage over bitmap information.

Also, character codes can be easily recognized by a CPU. Characters represented by bitmaps are extracted by performing pattern matching, but this requires very high processing power and a large amount of processing time. Character codes are compared with codes prepared for comparison, and characters are recognized according to the comparison results, which is very simple. Therefore, character codes have a considerable advantage over bitmap information because the character codes can be easily searched and recognized. It should be noted that the character extracting process is known, and therefore detailed description thereof is omitted.

As described above with reference to FIG. 19, if a generated job satisfies the transfer conditions in an associated set of transfer specifications (step S3802), the character extracting process is requested (step S3804). In the character extracting process, as shown in FIG. 26, a bitmap image 4400 input as the job is converted into a character code using a character extractor 4401, and the character code is recorded as a character extraction result 4402 in the image storage unit 160. Also, a transfer job for the input image 4400 is generated in accordance with transfer specifications 4404 (step S3805), and job history information 4403 indicative of an execution result of the transfer job is generated and recorded (step S3806). As indicated by an arrow 4405, the job history information 4403 is associated with the character extraction result 4402 by the context type 3702 and the object pointer 3703 constituting the detailed information (FIG. 23) of the job history information 4403.

As described above, according to the present embodiment, a character extraction result corresponding to an image dealt with by a transfer job can be recorded in association with job history information indicative of an execution result of the transfer job. As a result, it is possible to manage job history information on transfer jobs with a small storage capacity and in a detailed and efficient manner, and therefore a large number of transfer jobs can be managed with ease.

Although in the present embodiment, the liquid crystal display panel 500 of the operating unit 150 is used to peruse job history information and character extraction results, the present invention is not limited to this, but the printer unit 300 may be used to output job history information and character extraction results onto a sheet.

Figure 27:
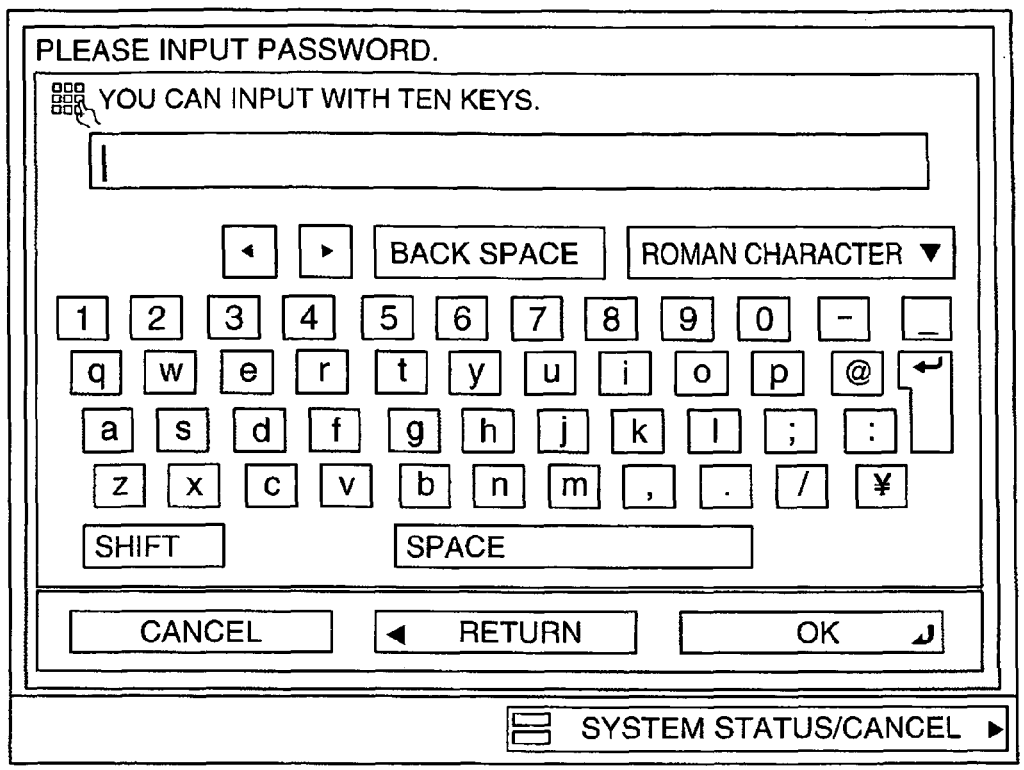
FIG. 27 is a view showing a password input screen displayed in an image processing apparatus according to a second embodiment of the present invention.

A description will now be given of a second embodiment of the present invention with reference to FIG. 27. FIG. 27 is a view showing an example of a password input screen displayed on an image processing apparatus according to the second embodiment.

The arrangement of the present embodiment is the same as arrangement with that of the above described first embodiment, and therefore description thereof is omitted. Only differences from the first embodiment will be described below.

In the above described first embodiment, a character extraction result associated with job history information indicative of an execution result of a transfer job can be perused by depressing the "details" button 3202 in the screen 3201 (FIG. 21). In view of security and privacy, however, it is undesirable that anyone can access all the character extraction results. Therefore, in the present embodiment, when the "details" button 3202 is depressed, a password input screen is displayed so as to limit access to a character extraction result. The screen in FIG. 27, for example, is displayed as the password input screen. If a password input on the screen matches a password registered in advance, a corresponding character extraction result is read out and displayed. Thus, only specific persons having authorized passwords such as system administrators can access character extraction results.

As a result, security improvement and privacy protection can be realized since only specific persons such as system administrators can peruse character extraction results associated with job history information.

Also, a limitation can be imposed such that only specific persons such as system administrators can peruse job history information indicative of execution results of transfer jobs. In this case, when the "details" button 3202 is depressed on the screen 3201 in FIG. 20, the password input screen in FIG. 27, for example, is displayed.

Figure 28:
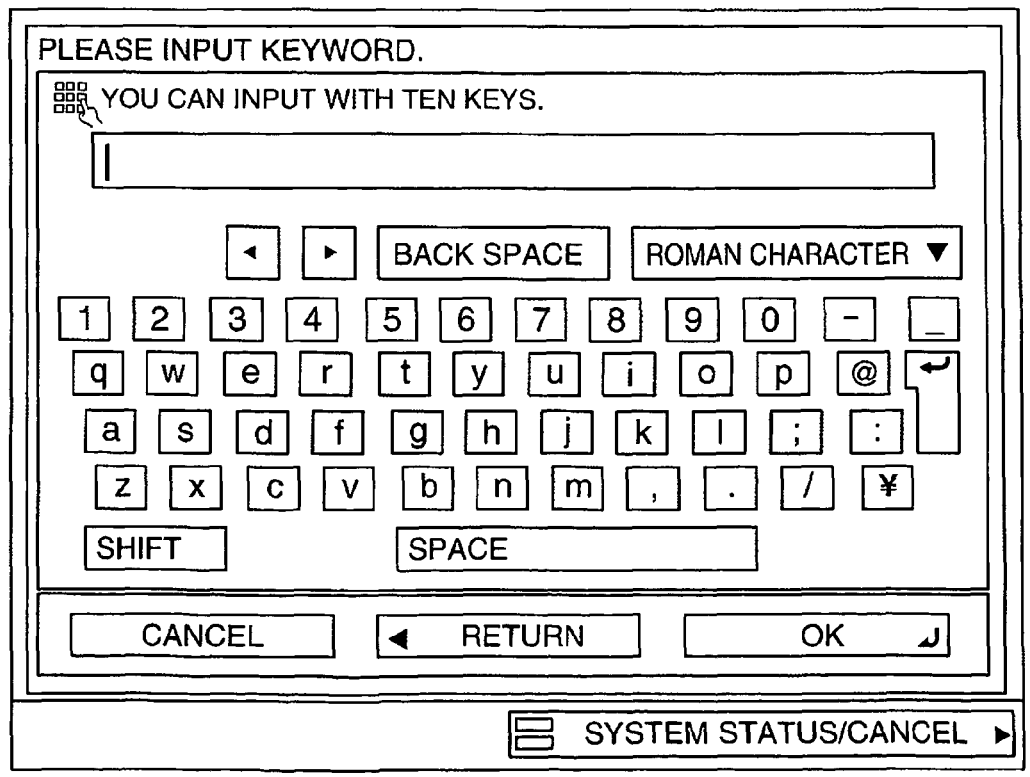
FIG. 28 is a view showing an example of a job termination word input screen of an image processing apparatus according to a third embodiment of the present invention.
Figure 29:
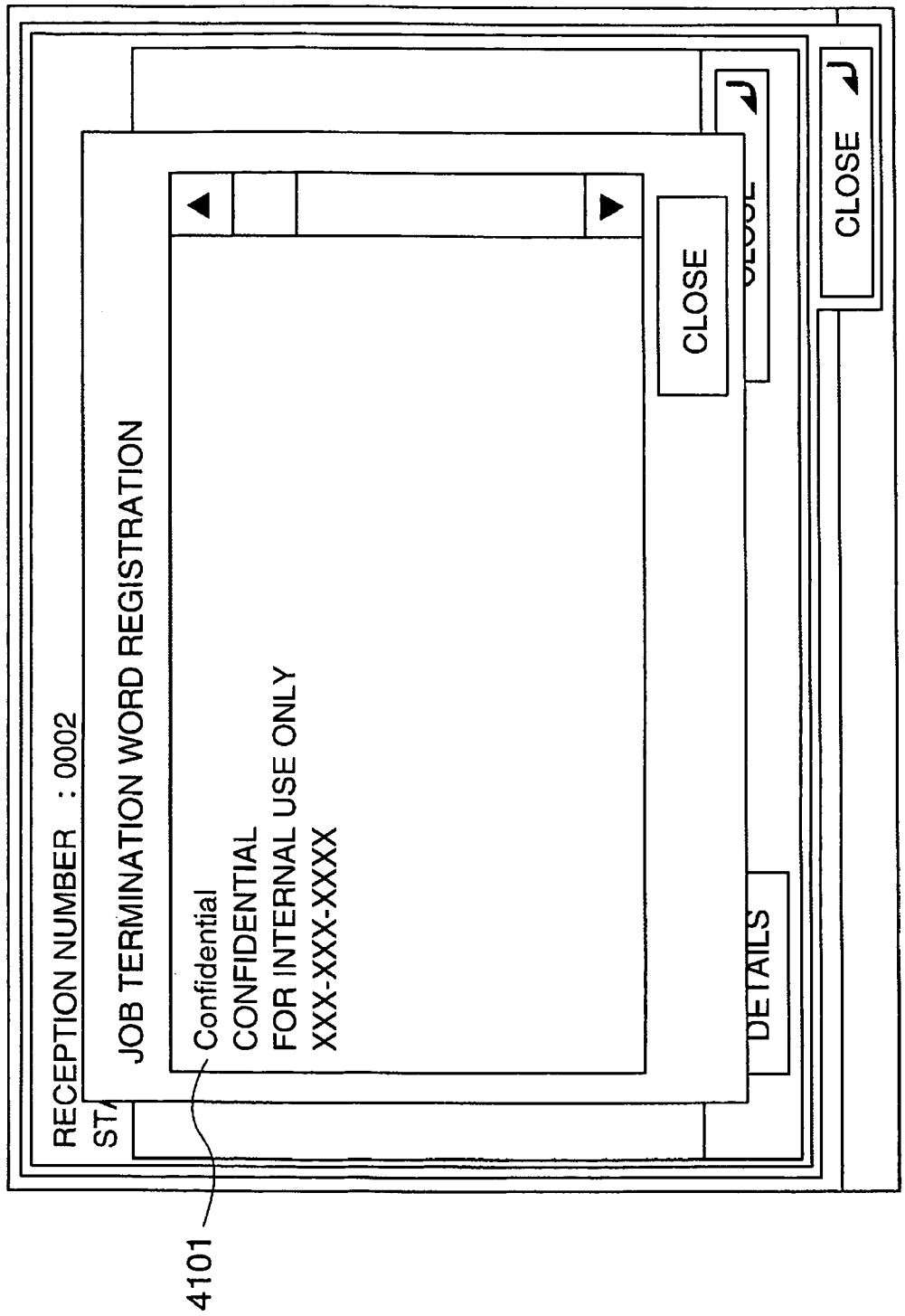
FIG. 29 is a view showing an example of a job termination word registration screen of the image processing apparatus according to the third embodiment.
Figure 30:
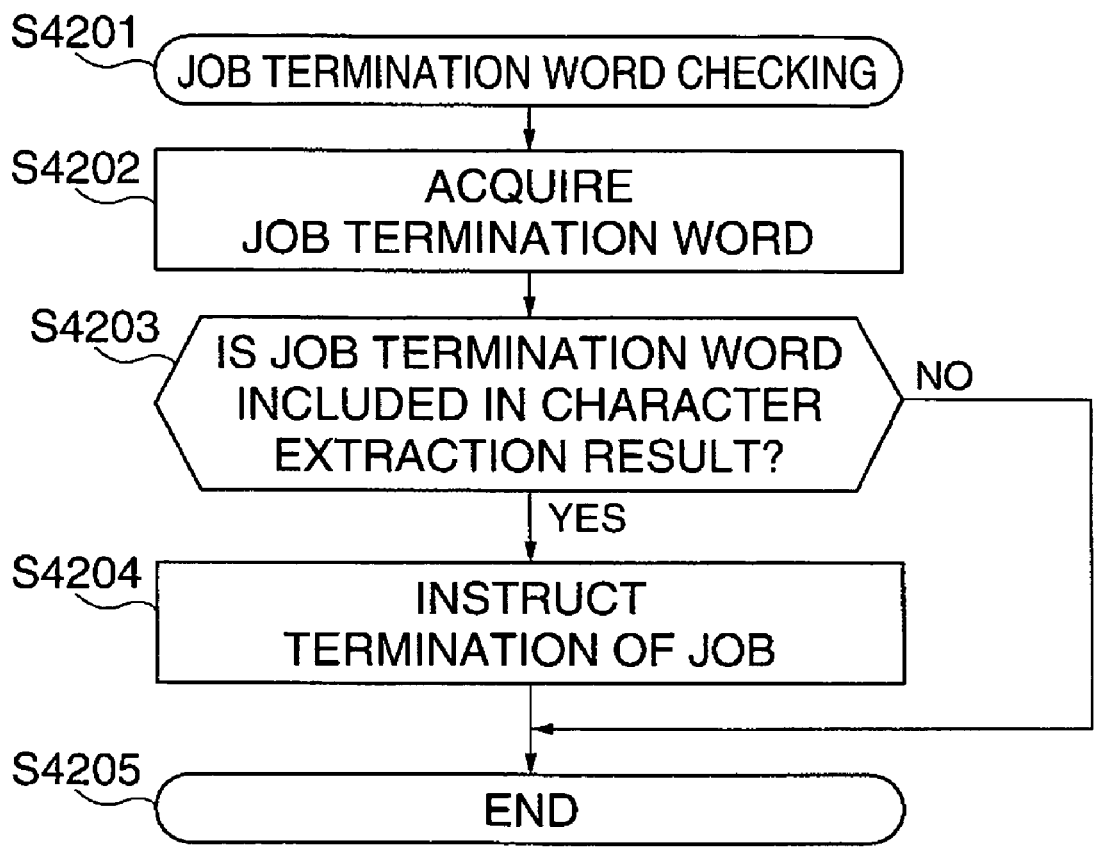
FIG. 30 is a flow chart showing the procedure of a transfer job terminating process based on a job termination word in the image processing apparatus according to the third embodiment.

A description will now be given of a third embodiment of the present invention with reference to FIGS. 28 to 30. FIG. 28 is a view showing an example of a job termination word input screen of an image processing apparatus according to the third embodiment, FIG. 29 is a view showing an example of a job termination word registration screen of the image processing apparatus according to the third embodiment, and FIG. 30 is a flow chart showing the procedure of a transfer job terminating process based on a job termination word in the image processing apparatus according to the third embodiment.

The arrangement of the present embodiment is the same as that of the above described first embodiment, and therefore description thereof is omitted. Only differences from the first embodiment will be described below.

In the present embodiment, to improve security level, if a specific character string such as "For internal use only" is detected from a job to be transferred, the job is inhibited from being transferred to any apparatus outside a company, and conversely only when a specific character string is detected from a job to be transferred, the job is permitted to be transferred.

Here, a description will be given of the case where when a specific character string is detected from a job to be transferred, the job is inhibited from being transferred to any apparatus outside a company. In this case, first, a specific character string for inhibiting the job from being transferred is input. In inputting the specific character string, a job termination word input screen in FIGS. 2-8, for example, is displayed, and a desired character string is input on this screen. Also, a job termination word registration screen 4101 in FIG. 29, for example, is displayed, and a desired word can be selected from a list of job termination word candidates in the job termination word registration screen 4101. If there is no desired word in the list of job termination word candidates in the job termination word registration screen 4101 in FIG. 29, the job termination word input screen in FIG. 28 can be displayed.

When a specific character string (or a word) is input via the above-mentioned screen, the specific character string is registered as a job termination word in the image storage unit 160, for example. The number of specific character strings (or words) to be input may be plural.

The controller 110 requests the character extracting process (step S3804 in FIG. 19). When a character extracting result is obtained by the character extracting process, the controller 110 starts a job termination word checking process (step S4201 in FIG. 30).

When the job termination word checking process (step S4201) is started, the process proceeds to a step S4202 wherein the controller 110 acquires a job termination word registered in the image storage unit 160. In a step S4203, the controller 110 then compares the acquired job termination word (character string) and the character extraction result with each other and determines whether or not the acquired job termination word (character string) is included in the character extraction result. If the acquired job termination word (character string) is included in the character extraction result, the process proceeds to a step S4204 wherein the controller 110 instructs the job manager 811 (FIG. 6) to terminate the transfer job, and the process then proceeds to a step S4205 wherein the controller 110 terminates the process. The job manager 811 terminates the transfer job. This brings about an "error" result of the job (for example, the transfer job 3102 in FIG. 20).

On the other hand, if the acquired job termination word (character string) is not included in the character extraction result, the process proceeds to a step S4205 wherein the controller 110 terminates the process without instructing termination of the transfer job.

As described above, according to the present embodiment, a document including a predetermined word can be automatically inhibited from being transferred, and therefore security level can be further improved.

Conversely, when a specific character string is included in a character extraction result, a job is permitted to be transferred.

A description will now be given of a fourth embodiment of the present invention with reference to FIGS. 31 and 32.

Figure 31:
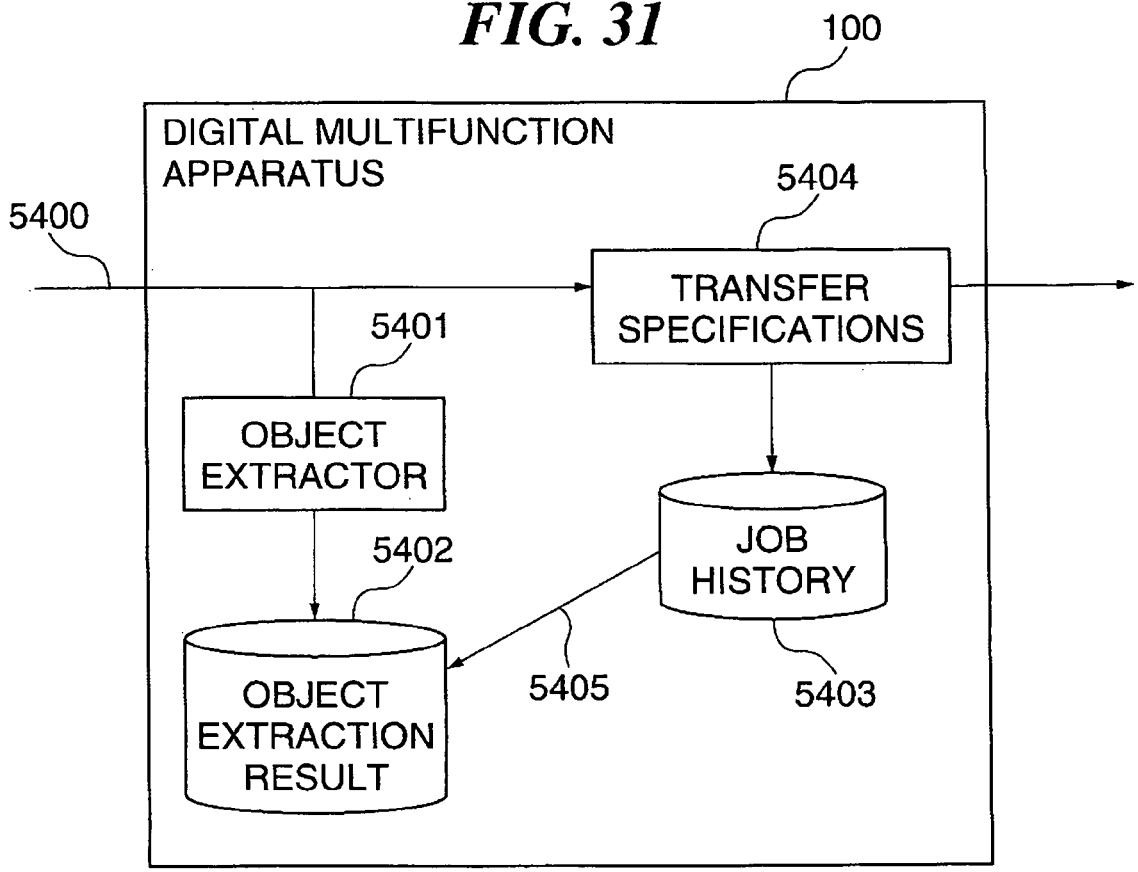
FIG. 31 is a diagram schematically showing a manner in which an object extraction result and job history information are associated with each other in an image processing apparatus according to a fourth embodiment of the present invention.
Figure 32:
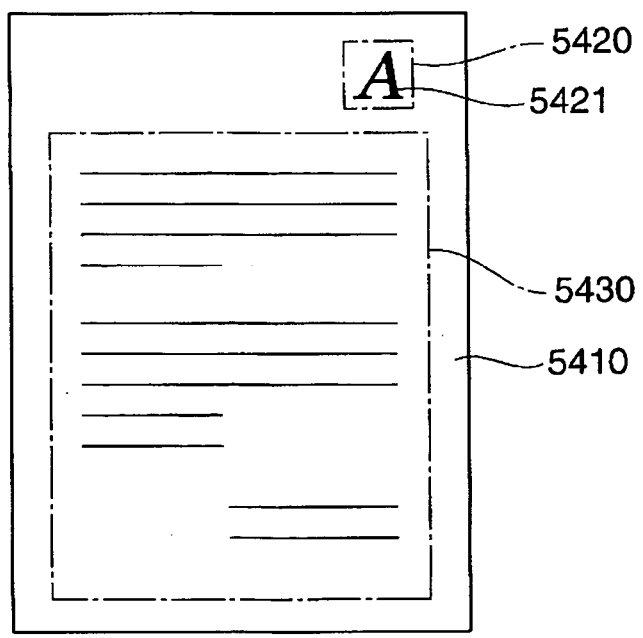
FIG. 32 is a view schematically showing an input image with a mark.

FIG. 31 is a diagram schematically showing a manner in which an object extracting result and job history information are associated with each other in an image processing apparatus according to the fourth embodiment, and FIG. 32 is a view schematically showing an input image with a mark.

The arrangement of the present embodiment is basically the same as that of the above described first embodiment, and therefore only differences from the first embodiment will be described below.

In the first embodiment, processing is performed in accordance with recognized character information, but in the present embodiment, the same processing is performed in accordance with a recognized object other than character information. Specifically, an object recognizing process is carried out on input (received) image information to determine whether or not a predetermined object registered in advance is included in the image information, and subsequently the same processing as the above processing based on character information is performed.

As is the case with the first embodiment, the controller 110 of the digital multifunction apparatus 100 executes the transfer job performing routine in FIG. 19. In this routine, if it is determined that a job that satisfies transfer conditions constituting part of transfer specifications 5404 has been generated, the controller 110 requests an object extractor 5401 to carry out the object extracting process.

In the present embodiment, a predetermined object such as a predetermined mark (graphics object) 5421 can be included in a predetermined area of an input image 5400 (in the example shown in FIG. 32, a top area 5420 of a first page 5410 of the input image 5400). Although the mark 5421 illustrated in FIG. 32 is very simple, it is preferred that the mark 5421 clearly indicates a sender and contents of an input image, such as character information (for example, a character extraction result as shown in FIG. 24) extracted from the input image in the first embodiment. Thus, in the present embodiment, many different marks 5421, which vary depend on senders and contents of images, are used.

The object extracting process is intended to determine whether or not the predetermined mark 5421 is included in the input image 5400. To this end, determination information for identifying various marks 5421 is stored in advance in the object extractor 5401 or the controller 110. The determination information may be any type insofar as it can identify each mark 5421. For example, known vectorization is performed in advance on image data of each mark to acquire vector data that characterizes each mark, and such vector data is used as determination information.

In response to the request to carry out the object extracting process, the object extractor 5401 inputs image data of the first page 5410, extracts image data of the top area 5420 from the input image data, and performs object extraction such as vectorization on the extracted image data to acquire vector data corresponding to the extracted image data. If the vector data matches any piece of determination information (vector data) stored in advance in the object extractor 5401 or the controller 110, the vector data is recorded as an object extraction result 5402 in the image storage unit 160. A transfer job for the input image 5400 is then generated in accordance with the transfer specifications 5404, and job history information 5403 indicative of an execution result of the transfer job is generated and recorded.

Transfer job history information and an object extracting result (predetermined object) are recorded in association with each other as indicated by an arrow 5405. As s a result, a large number of transfer jobs can be managed even with a small storage capacity.

It should be noted that a predetermined object such as the predetermined mark (graphics object) 5421 should not necessarily be put in the top area 5420 of an image, but a predetermined mark may be put at an arbitrary position in an image. In this case, a predetermined object area is extracted from an image by a conventionally known area dividing process, and the object extracting process is carried out on the extracted area.

Also, a predetermined object such as the predetermined mark 5421 may be used in place of a job termination word in the above described third embodiment.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and perform the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magneto-optical disk, an optical disk such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

This application claims priority from Japanese Patent Application No. 2004-377894 filed Dec. 27, 2004, which is hereby incorporated by reference herein.

What is claimed is:

1. An image processing apparatus comprising:
a transfer job performing device that performs a transfer job for transferring image information input to the image processing apparatus to at least one destination;
a character information extracting device that carries out a character recognition process to the input image information and extracts character information from the input image information based on the character recognition process, the extracted character information indicating at least a specific character string represented in the input image information and indicating a security level of the input image information;

a history information generating device that generates history information indicative of a result of execution of the transfer job by said transfer job performing device;

a recording device that records the extracted character information instead of the input image information itself in association with the generated history information in a storage device;

a display device that displays for perusal at least one of at least one piece of history information recorded in the storage device and at least one piece of character information recorded in association with the history information;

a first determining device that determines whether particular character information is included in the extracted character information; and a second determining device that determines whether execution of the transfer job by said transfer job performing device is inhibited or permitted in accordance with a result of the determination by said first determining device, wherein the particular character information is one of character information for inhibiting the execution of the transfer job and character information for permitting the execution of the transfer job.

2. An image processing apparatus according to claim 1, wherein:

said display device comprises a display unit and an instruction input device that inputs a user instruction for displaying history information and a user instruction for displaying character information; and said instruction input device is operable after the history information is displayed on said display unit in response to the user instruction for displaying the history information being input, to accept input of the user instruction for displaying character information associated with the displayed history information.

3. An image processing apparatus according to claim 2, wherein said instruction input device is operable when inputting the user instruction for displaying character information associated with the displayed history information, to request a user to input a password, and to accept input of the user instruction for displaying the character information when the password input in response to the request is an authorized password.

4. An image processing apparatus according to any of claims 1 to 3, wherein said transfer job performing device is operable when image information received from an external apparatus by the image processing apparatus satisfies predetermined conditions, to transfer the received image information to the at least one destination.

5. A method of managing a transfer job for transferring input image information to at least one destination, comprising:

a character information extracting step of carrying out a character recognition process to the input image information and extracting character information from the input image information based on the character recognition process, the extracted character information indicating at least a specific character string represented in the input image information and indicating a security level of the input image information;

a history information generating step of generating history information indicative of a result of execution of the transfer job;

a recording step of recording the extracted character information instead of the input image information itself in association with the generated history information in a storage device;

a display step of perusing at least one of at least one piece of history information recorded in the storage device and at least one piece of character information recorded in association with the history information;

a first determining step of determining whether particular character information is included in the extracted character information; and a second determining step of determining whether execution of the transfer job is inhibited or permitted in accordance with a result of the determination in said first determining step, wherein the particular character information is one of character information for inhibiting execution of the transfer job and character information for permitting execution of the transfer job, and wherein said steps are implemented at least in part by a computer.

6. A transfer job managing method according to claim 5, wherein in said display step, when a user gives an instruction for displaying history information, history information is displayed on a display unit, and when the user gives an instruction for displaying character information associated with the displayed history information, character information associated with the history information is displayed on the display unit.

7. A transfer job managing method according to claim 6, wherein in said display step, when the user gives the instruction for displaying the character information associated with the displayed history information, the user is requested to input a password, and when the password input in response to the request is an authorized password, the instruction for displaying the character information is accepted.

8. A transfer job managing method according to any of claims 5 to 7, wherein the transfer job is a transfer job that transfers image information received from an external apparatus to the at least one destination when the image information satisfies predetermined conditions.

9. A non-transitory computer-readable storage medium storing a program that, when executed by a computer, causes the computer to execute a method of managing a transfer job for transferring input image information to at least one destination, the program comprising:

a character information extracting module for carrying out a character recognition process to the input image information and extracting character information from the input image information based on the character recognition process, the extracted character information indicating at least a specific character string represented in the input image information and indicating a security level of the input image information;

a history information generating module for generating history information indicative of a result of execution of the transfer job;

a recording module for recording the extracted character information instead of the input image information itself in association with the generated history information in a storage device;

a display module for perusing at least one of at least one piece of history information recorded in the storage device and at least one piece of character information recorded in association with the history information;

a first determining module for determining whether particular character information is included in the extracted character information; and a second determining module for determining whether execution of the transfer job is inhibited or permitted in accordance with a result of the determination by said first determining module, wherein the particular character information is one of character information for inhibiting execution of the transfer job and character information for permitting execution of the transfer job.

* * * * *